US 8,548,650 B1

(12) United States Patent
Prince et al.

(10) Patent No.: US 8,548,650 B1
(45) Date of Patent: *Oct. 1, 2013

(54) HIERARCHICAL CLOSED-LOOP CONTROL SYSTEM FOR AIRCRAFT, MISSILES AND MUNITIONS

(75) Inventors: Troy S. Prince, Cleveland, OH (US); Richard Kolacinski, South Euclid, OH (US); Mehul Patel, Streetsboro, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,182

(22) Filed: Apr. 25, 2012

Related U.S. Application Data

(63) Continuation of application No. 12/557,599, filed on Sep. 11, 2009, now Pat. No. 8,190,305, which is a continuation of application No. 11/311,767, filed on Dec. 19, 2005, which is a continuation of application No. 10/725,266, filed on Dec. 1, 2003, now Pat. No. 8,417,395, which is a continuation-in-part of application No. 10/336,117, filed on Jan. 3, 2003, now Pat. No. 6,685,143.

(51) Int. Cl.
  *B64C 13/00* (2006.01)
  *F41G 7/00* (2006.01)
  *G01C 23/00* (2006.01)

(52) U.S. Cl.
  USPC ............ 701/3; 701/29.1; 244/3.22; 244/3.24; 244/175

(58) Field of Classification Search
  USPC .................. 701/29.3, 14, 3, 29.1, 29.9, 30.2, 701/31.9; 244/3.1, 3.15, 75.1, 99.8, 3.22, 244/3.24, 3.27, 76 A, 175
  See application file for complete search history.

(56) References Cited

U.S. PATENT DOCUMENTS

| | | | | |
|---|---|---|---|---|
| 5,195,046 A | * | 3/1993 | Gerardi et al. | 702/35 |
| 5,752,672 A | * | 5/1998 | McKillip, Jr. | 244/99.8 |
| 5,938,148 A | * | 8/1999 | Orenstein | 244/3.15 |
| 8,190,305 B1 | * | 5/2012 | Prince et al. | 701/3 |
| 2004/0251383 A1 | * | 12/2004 | McDonnell | 244/82 |

OTHER PUBLICATIONS

Bieniawski et al. "Flutter Suppression Using Micro-Trailing Edge Effectors" AIAA paper, Apr. 7-10, 2003, pp. 1-10.*

* cited by examiner

*Primary Examiner* — Christine Behncke
(74) *Attorney, Agent, or Firm* — Brian Kolkowski

(57) ABSTRACT

The present invention relates to a missile or munition with a hierarchical, modular, closed-loop flow control system, more particularly to aircraft or munition with flow control system for enhanced aerodynamic control, maneuverability and stabilization. The present invention further relates to a method of operating the flow control system.

Various embodiments of the flow control system involve elements including flow sensors, active flow control devices or activatable flow effectors, and logic devices with closed loop control architecture. The sensors are used to estimate or determine flow conditions on the surfaces of a missile or munition. The active flow control device or activatable flow effectors create on-demand flow disturbances, preferably micro-disturbances, at different points along the various aerodynamic surfaces of the missile or aircraft to achieve a desired stabilization or maneuverability effect. The logic devices are embedded with a hierarchical control structure allowing for rapid, real-time control at the flow surface.

20 Claims, 29 Drawing Sheets

HIERARCHICAL CLOSED-LOOP CONTROL SYSTEM FOR AIRCRAFT, MISSILES AND MUNITIONS

CROSS REFERENCE TO RELATED APPLICATIONS

This application is a continuation of co-pending U.S. patent application Ser. No. 12/557,599, which was filed on Sep. 11, 2009, which is a continuation of patent application Ser. No. 11/311,767 filed on Dec. 19, 2005, currently pending, which is a continuation of U.S. patent application Ser. No. 10/725,266 filed on Dec. 1, 2003, currently pending, which is a continuation-in-part of U.S. patent application Ser. No. 10/336,117 filed on Jan. 3, 2003 which issued as U.S. Pat. No. 6,685,143 on Feb. 3, 2004.

The U.S. Government has a paid-up license in this invention and the right in limited circumstances to require the patent owner to license others on reasonable terms provided for by the terms of grant number F33615-02-M-32217 awarded by the United States Air Force.

BACKGROUND OF THE INVENTION

1. Field of the Invention

The present invention relates to a missile or aircraft with a hierarchical closed-loop flow control system and more particularly to aircraft or missile with a flow control system for aerodynamic control, maneuverability and stabilization. The present invention further relates to a method of operating the flow control system.

2. Technical Background

Traditional aircraft and missile maneuvering technologies utilize hinged control surfaces such as the wings, tail-fins and forebody-canards to provide control and stability through all phases of an aircraft's or missile's flight path. These control surfaces require significant volume to house the control actuation system, which includes heavy servomotors, thereby imposing significant limitations on the aircraft or missile's aerodynamic performance. These hinged-control surfaces also reduce the effective payload, maximum achievable range, and lethality of missiles and aircraft.

Conventional missile and aircraft control techniques are not capable of meeting new multi-mission highly accurate, long-range fire requirements that are needed to ensure the multi-target engagement capabilities of missiles or aircraft, particularly "smart" missiles and aircraft. In addition, with a missile the overall cost of the control system per round needs to be minimum without affecting the aerodynamic efficiency of the missiles considering their subsistence period once deployed. The major disadvantages of traditional control surfaces is space restriction, i.e., control surfaces must be located in an annular space around the throat of the propulsion nozzle; increased weight; and drag from exposed surfaces. The conventional control surfaces necessitate hinges, which increase the overall weight induced aerodynamic drag and also the complexity of the propulsion system. There is therefore a need for a distributed control system for improving performance of aircraft, missiles and munitions.

Active flow control enables a mechanism to alter the flow around the aerodynamic surface(s) in order to achieve a desired air vehicle maneuver by utilizing micro-actuators that are located optimally on the aerodynamic surface of air vehicles. Most of the active flow control systems currently in use, or under investigation, operate in the open-loop mode, i.e., the control input (via micro-actuators) is not continuously adjusted based on the sensor information. Such open-loop flow control systems fail to maintain the required aerodynamic performance of the air vehicle under dynamic conditions. Dynamic, in this context, is referred to flow instabilities or vehicle motion. In view of the foregoing disadvantages of currently used control surfaces and open-loop flow control systems, it has become desirable to develop a robust, closed-loop, active flow control system that provides the necessary control moments in real-time by utilizing fast-response sensors and fast-acting control actuators, so as to maintain and enhance the overall aerodynamic performance of the missile or the aircraft. It is further desirable to develop a flow control system for missile and aircraft control that enables low-cost, low-weight and low-volume sensor-actuator-controller modules to control local flow phenomena for enhanced aerodynamic performance. It is still even further desirable to develop a missile, aircraft and munition control system that can control numerous flow control devices with associated sensors using a multi-tiered, hierarchical control architecture using a higher level controller for real-time aerodynamic control.

SUMMARY OF THE INVENTION

The present invention relates to a missile or aircraft with a hierarchical, closed-loop flow control system and more particularly to aircraft or missile with a flow control system for enhanced aerodynamic control, maneuverability and stabilization. The present invention further relates to a method of operating the flow control system.

Various embodiments of the flow control system of the present invention involve different elements including flow sensors; active flow control devices or activatable flow effectors; and logic devices with closed loop control architecture. The sensors of these various embodiments are used to estimate or determine typical flow conditions, such as flow separation, on various surfaces of a missile or aircraft. The active flow control devices or activatable flow effectors of these various embodiments create on-demand flow disturbances, preferably micro-disturbances, to affect the flowfield in a desired manner at different points along the various aerodynamic surfaces of the missile or aircraft for enhanced aerodynamic control, maneuverability or stabilization effect. The logic devices are embedded with a hierarchical control structure to allow rapid, real-time control of fluid flow at the surface.

The logic device(s) with the hierarchical control structure of the various embodiments of the present invention is composed of at least two levels of hierarchy or structure. The lower level in various embodiments is composed of multiple local or minor-loop feedback controllers that modulate the lift over discrete sections of the aerodynamic surfaces or aerodynamically-coupled surfaces and track the lift trajectories supplied by the global control system. The logic/control laws for the local controllers may be resident within local control modules. The higher level global control system, which in various embodiments takes as input the desired body moments and supplies as output the lift distribution for the wing and/or other aerodynamic surfaces, necessary to achieve the desired moments. The global control system may be either centralized or distributed, and therefore, its logic, may also be fully or partially resident within one or more logic devices.

The present invention in certain specific embodiments also provides for a modular, intelligent active flow control device or activatable flow effector, and sensor that can be integrated into the missile or aircraft airframe. In other embodiments, arrays of the active flow control device or activatable flow effectors and sensors are used to control flow phenomena such as flow separation and reattachment on the various aerodynamic surfaces or aerodynamically-coupled surfaces of either or both a missile or an aircraft. In still other embodiments, a low-power, intelligent flow control system is shown, which provides aerodynamic shaping of a missile or aircraft. In still further embodiments the control system is augmented with a health monitoring system.

In one embodiment, the present invention includes a missile or an aircraft comprising an aerodynamic surface or aerodynamically-coupled surfaces; at least two air flow control zones on the same aerodynamic surface or aerodynamically-coupled surfaces; at least one of the air flow control zones comprising at least one active flow control device or activatable flow effector; and one or more logic devices, the logic devices having a control system comprising separate local, closed loop control system for each flow control zone, and a global control system to coordinate the local control systems.

In another embodiment, the present invention includes a missile or an aircraft comprising an aerodynamic surface or aerodynamically-coupled surfaces; at least two air flow control zones on the same aerodynamic surface or aerodynamically-coupled surfaces; the at least two air flow control zones each comprising at least one active flow control device or activatable flow effector and at least one sensor having a signal; and one or more logic devices, the logic devices having a separate local, closed loop control system for each flow control zone, and a global control system to coordinate the separate, multiple input local control systems wherein the separate local, closed loop control system activates and deactivates the at least one active flow control device or activatable flow effector based on at least in part the signal of one of the sensors.

In still another embodiment, the present invention includes a missile or an aircraft comprising at least two air flow control zones on the aircraft or missile; at least one of the air flow control zones comprising at least one active flow control device or activatable flow effector; and one or more logic devices, the logic devices having a separate local, closed loop control system for each flow control zone, and a global control system to coordinate the local control systems.

In yet another embodiment, the present invention includes a missile or an aircraft comprising an aerodynamic surface or aerodynamically-coupled surfaces; at least two air flow control zones on the same aerodynamic surface or aerodynamically-coupled surfaces; the at least two air flow control zones each comprising at least one active flow control device or activatable flow effector; and one or more logic devices, the logic devices having a separate local, closed loop control system for each flow control zone for activating and deactivating the at least one active flow control device or activatable flow effector, and a global control system to coordinate the local control systems.

In yet another embodiment, the present invention includes a missile or an aircraft comprising at least two air flow control zones on the aircraft or missile; at least one of the air flow control zones comprising at least one active flow control device or activatable flow effector and at least one sensor having a signal; and one or more logic devices, the logic devices having a separate local, closed loop control system for each flow control zone, and a global control system to coordinate the local control systems wherein the separate local, closed loop control system activates and deactivates the at least one active flow control device or activatable flow effector based on at least in part the signal of the at least one sensor.

In yet another embodiment, the present invention includes a missile or an aircraft comprising an aerodynamic surface or aerodynamically-coupled surfaces; at least two air flow control zones on the same aerodynamic surface or aerodynamically-coupled surfaces; at least one of the air flow control zones comprising at least one active flow control device or activatable flow effector and at least one sensor having a signal; and one or more logic devices, the logic devices having a separate local, closed loop control system for each flow control zone, and a global control system to coordinate the separate, multiple input local control systems wherein the separate local, closed loop control system activates and deactivates the at least one active flow control device or activatable flow effector based on at least in part the signal of the at least one sensor.

In yet another embodiment, the present invention includes a missile or an aircraft comprising at least two air flow control zones on the aircraft or missile; the at least two air flow control zones each comprising at least one active flow control device or activatable flow effector and at least one sensor having a signal; and one or more logic devices, the logic devices having a separate local, closed loop control system for each flow control zone, and a global control system to coordinate the separate, multiple input local control systems wherein the separate local, closed loop control system activates and deactivates the at least one active flow control device or activatable flow effector based on at least in part the signal of one of the sensors.

In yet another embodiment, the present invention includes a missile or an aircraft comprising at least two air flow control zones on the aircraft or missile; the at least two air flow control zones each comprising at least one active flow control device or activatable flow effector; and one or more logic devices, the logic devices having a separate local, closed loop control system for each flow control zone for activating and deactivating the at least one active flow control device or activatable flow effector, and a global control system to coordinate the local control systems.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENT

Figure 1:
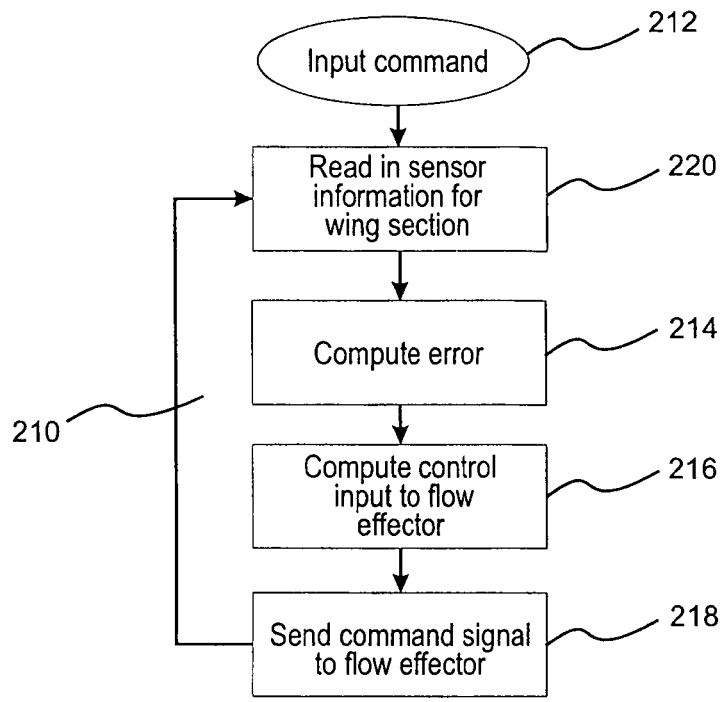
FIG. 1. Flow diagram for a fixed, cascade controller for local control of an individual active flow control device or activatable flow effector.

The present invention relates to a missile or aircraft with a hierarchical, closed-loop flow control system and more particularly to aircraft or missile with a flow control system for aerodynamic control, maneuverability and stabilization. The present invention further relates to a method of operating the flow control system. The present invention involves the airflow control or flow control on any aerodynamic surface, aerodynamically-coupled surfaces or any combination of aerodynamic surfaces on a missile or aircraft including but not limited to lift surface control, forebody control, afterbody control and any combination thereof. The forebody herein is described as the front half of the missile or aircraft or that portion in front of the lift surfaces, i.e., the wings. Preferably, the forebody is the front 25% of the length of the missile or aircraft, and most preferably the forebody is the nose of the missile or aircraft. The nose of the missile or aircraft is the cone shaped leading edge. The afterbody herein is described as the back half of the missile or aircraft or that portion behind the lift surfaces, i.e., the wings. Preferably, the afterbody is the back 25% of the length of the missile or aircraft, and most preferably the afterbody is the tail section of the missile or aircraft including but not limited to the tail fins and boattail.

The aerodynamic surfaces of the various embodiments of the present invention are those surfaces over which the airflow moves during the flight of the missile or aircraft. Aerodynamically-coupled surfaces are those surfaces which are aerodynamically linked by airflow. Preferably, aerodynamically-coupled surfaces are those surfaces which are joined together over which the airflow moves during the flight of the missile, aircraft or munition. An example of aerodynamically-coupled surfaces are a wing and the fuselage of the missile or aircraft. Another example of aerodynamically-coupled surfaces is a control surface on a missile or munition when it is attached or just released from an aircraft and changes in the flow over the aircraft impact the flow over the attached or just released missile or munition.

The flow effectors of the various embodiments of the present invention include any or both active flow control device or activatable flow effectors, and traditional control surfaces. The active flow control device or activatable flow effectors of the present invention include any electromechanical devices that can induce flow perturbation via either, mass, momentum, or energy transfer into the flow field around the surface of a missile or an aircraft. Preferably, the active flow control device or activatable flow effectors create small disturbances in the vicinity or close proximity to the actuator. Further preferably, the active flow control device or activatable flow effector is flush or is nearly flush, when deactivated, with the surface of the missile or aircraft to which it has been installed thereby creating little to no drag from the device or effector itself on the munition, missile or aircraft. Still further preferably, the active flow control device or activatable flow effectors have no hinged parts or surfaces exposed to the airflow. The active flow control device or activatable flow effectors of the present invention include but are not limited to active vortex generators, which are deployable or create pressure active regions by suction or air pressure; synthetic jets; pulsed vortex generators; plasma actuators including weakly ionized plasma actuators; wall turbulators; porosity including but not limited to inactive and active; microactuators; and thermal actuators. The present invention further relates to a method of operating the flow control system.

The flow control system for stabilization and maneuverability of the missile or aircraft afterbody relies on the effectiveness of the in generating on-demand forces at different points around the missile or aircraft afterbody to create the desired control effect. The flow control system for the missile or aircraft afterbody can be used at both low and high angles of attack. The active flow control devices or activatable flow effectors of the present invention include active micro-vortex generators that effectively control the pressure distribution along the aerodynamic surfaces of a missile, munition or aircraft, yielding forces and yawing, rolling and pitching moments for controlling of yaw, roll or pitch on the munition, missile or aircraft body. The active flow control devices or activatable flow effectors of the present invention preferably are deployable flow effectors or other types of micro-vortex generators. Active flow control devices or activatable flow effectors of the present invention are flow effectors that are activated to generate fluid flow disturbances in the vicinity of the flow effector, and that can be deactivated when not needed. Preferably, the active flow control device or activatable flow effectors of the present invention can be activated and deactivated at high frequencies.

Preferably, active flow control devices or activatable flow effectors can produce modulated disturbances or be operated in a binary manner. Further preferably, if operated in a binary manner the active flow control devices or activatable flow effectors can be cycled at various frequencies. Further preferably, the active flow control device or activatable flow effectors are capable of being cycled at frequencies of at least about 1 Hz, more preferably at frequencies of at least about 20 Hz, even more preferably at frequencies of at least about 60 Hz, even more preferably at frequencies of at least about 100 Hz, and most preferably at frequencies of at least about 250 Hz. Deployable flow effectors, one type of active flow control device or activatable flow effectors, are described in more detail in the various embodiments in the Figures below. The frequencies at which the flow effectors of the present invention are cycled may be determined based in part on a number of factors including but not limited to autopilot frequency response characteristics, missile or aircraft dynamics, and missile or aircraft environmental conditions. Actuators such as distributed porosity or suction based systems are nominally binary devices in that each individual or groups of holes may be turned on or off on an individual basis, however these systems may also be operated in a larger aggregate group, thereby forming a single active flow control device or activeable flow effector which is capable of producing modulated flow responses.

Some of the other types of activatable flow effectors not shown in the Figures (but described in more detail in U.S. Pat. No. 6,302,360 B1 to Ng which is herein incorporated by reference) include spaced apart valves that are positioned at inlets of a vacuum or pressure chamber, or are connected by pneumatics to a vacuum or pressure source. Preferably, the valves contain a flap that operates to open and close the valves as directed by electrostatic forces. Other valve configurations can also be used. When the valves are opened, the negative pressure from the vacuum chamber or source causes withdrawal of air from the surface of the missile or aircraft forebody through the surface orifices. Therefore, it can be seen that the opening of the valves causes the pressure active region to generate a net inflow of air from the upper flow of air traveling across the surface of the missile or aircraft afterbody. This net inflow of air causes a disturbance in the upper flow, resulting in the generation of vortices, which act beneficially to stabilize the airflow over the aerodynamic surface or aerodynamically-coupled surfaces of the munition, missile or aircraft, or to create commanded forces on the missile or aircraft afterbody to improve maneuverability and/or stability. Similarly, when the valves are open to a positive pressure chamber or source, a net outflow of air is generated resulting in the generation of vortices, which also act beneficially to create forces or reattach the air flow to the aerodynamic surface(s) of the munition, missile or aircraft. For purposes of this invention flow effectors include any type of device or article known to those skilled in the art or discovered at a later point that is used to assist in the creation of forces or reattachment of airflow to a munition, missile or aircrafts surface. Preferably, the active flow control devices or activatable flow effectors of the present invention are deployable flow effectors. Further preferably, the missile or aircraft of the present invention has at least about 4 activatable flow effectors, more preferably at least about 6 activatable flow effectors, even more preferably at least about 8 activatable flow effectors, still even more preferably at least about 50, and most preferably at least about 200. The applicants further incorporate by reference U.S. patent application Ser. Nos. 10/336,114, and 10/336,113.

The sensor(s) of the present invention include but are not limited to a dynamic pressure sensor, shear stress sensor (hot film anemometer, a direct measurement floating-element shear stress sensor), inertial measurement unit or system, and other sensors known to those skilled in the art whose signal could be used to estimate or determine a flow condition on the surface of the missile or aircraft, which would function as a trigger point for actuating the flow control actuator. The sensors of the present invention can be used to determine or estimate flow separation. An inertial measurement unit for example is a sensor, which would not directly measure forces or flow separation, but can be used to estimate or predict separation. The preferred sensor of the present invention is a pressure sensor. The pressure sensor can be any type of sensor suitable for measuring the pressure at the flow surface. The pressure sensor can for example be a piezoelectric device, which generates an electric signal in response to a sensed pressure, a shape memory alloy device, or any other pressure sensor or transducer known to those skilled in the art. Preferably, the ratio of flow effectors to sensors is less than about 100:1, more preferably less than or equal to about 50:1, still preferably less than or equal to about 20:1, even more preferably less than or equal to about 3:1, still even more preferably less than or equal to about 2:1, and most preferably less than or equal to 1:1. The higher the concentration of pressure sensors to flow effectors the more redundancy and/or sensitivity can be built into the system utilizing the present invention. Most preferably the sensor is a flush, surface mounted diaphragm type pressure sensor. The at least one sensor 14 having a signal which is used at least in part by a controller (not shown) to activate and deactivate the at least one active flow control device or activatable flow effector 12.

In addition to pressure sensors, various embodiments of the present invention may also include a means for determining the relative spatial orientation of the flow effectors and/or sensors on the missile or aircraft body. This means would include utilizing the output of an inertial measurement unit and other systems, including but not limited to horizon sensors, satellite and mobile reference transmitters such as Global Positioning Systems (GPS), and magnetometers, which could be used to determine the missile or aircraft orientation. An inertial measurement unit provides six-degree-of-freedom motion sensing for applications such as navigation and control systems. Angular rate and acceleration are measured about three orthogonal axes.

The airflow control zone(s) of various embodiments of the present invention is a discrete area or region of an aerodynamic surface of the missile or aircraft. The airflow control zone(s) preferably comprises at least one active flow control device or activatable flow effector over which the airflow is locally controlled by the logic devices to be described further in this application. The airflow control zone(s), more preferably, further comprises at least one sensor having a signal. Preferably, the missile or aircraft comprises at least about 2 airflow control zones, more preferably at least about 4 airflow control zones, even more preferably at least about 8 airflow control zones, even more preferably at least about 16 airflow control zones, even more preferably about 32 airflow control zones, even more preferably at least about 64 airflow control zones, even more preferably about 128 airflow control zones, and most preferably at least about 256 airflow control zones. Preferably, the aerodynamic surface or aerodynamically-coupled surfaces of the missile or aircraft of the present invention comprise at least about 2 airflow control zones, more preferably at least about 3 airflow control zones, even more preferably at least about 4 airflow control zones, even more preferably at least about 6 airflow control zones, even more preferably at least about 10 airflow control zones, even more preferably at least about 16 airflow control zones, even more preferably at least about 24 airflow control zones, and most preferably at least about 40 airflow control zones. The airflow control zones may include an airflow control zone or zones, which include, utilize, or work in conjunction with traditional flow control devices and surfaces such as flaps and slats. At least one of the airflow control zones comprises at least one active flow control device or activatable flow effector.

The logic device(s) of the various embodiments of the present invention include either or both analog and digital circuits. Preferably, the logic device(s) is a digital circuit. The logic devices include but are not limited to computers, microprocessors, control circuits, field programmable gate arrays, programmable logic chips, analog computers, micro-controllers, and the like. Preferably, the missile or aircraft of the present invention comprises one or more logic devices that are partially or fully utilized for controlling the airflow over the aerodynamic surface(s) of the missile or aircraft. The one or more logic devices comprise a hierarchical control structure. This control structure comprises a separate local, closed loop control system for each flow control zone and a global control system to coordinate the action of the local control systems.

This hierarchical control structure comprises hierarchical algorithm architectures embedded within the one or more logic devices which are categorized in several ways. Preferably, the control system including all elements of the system controlling the airflow zones possess an input/output structure. That is, specific inputs to the control system exist which can affect the output of the control system, which is some'measurable behavior(s) (i.e., control command). In addition, preferably the control system has memory, or dependence upon previous conditions and inputs. The memory of the control system preferably is described by the system state a parameter(s) that describes or captures the physical characteristics of the system. For instance, for controlling the position of or the flow around the aircraft or missile, the input to the control system could be a quality of the airflow, i.e., pressure, velocity, etc across an aerodynamic surface, the output would then be a level of actuator effort (in our case the active flow control device or activatable flow effector).

The algorithms may be categorized in terms of the type of information used to formulate the control directives. Under this system of classification, the control architectures are cascade algorithms or output feedback algorithms. In cascade algorithms, the system output is used directly to compute an error signal (the difference between the desired and measured/observed behaviors) that is the basis of the controller's action. Conversely, output feedback algorithms compute a feedback signal based upon the system output which is in turn used to compute an error signal and hence the control action. In many cases, cascade algorithms are state feedback algorithms where the control input is based upon the state (either directly measured or obtained via an observer) of the system.

Another classification is based upon the constancy of the controller parameters. Under this taxonomy, the controller may be described as a fixed controller or as an adaptive controller. It should be noted that this distinction is not necessarily clear-cut. For instance, gain scheduling controllers will change the controller parameters according to a fixed schedule, that is, in one region of a system's operational envelope, one set of controller parameters will be used. If the system then moves into another region of the operational envelope, a new set of parameters will be obtained from a look up table, or schedule, and substituted. In this scenario, the parameters are changed open loop, there is no feedback loop modulating the controller parameters. Despite the fact that the controller parameters change, a gain scheduling controller is still classified as a fixed gain controller because the changes are performed open loop. The defining characteristic of adaptive controllers is that a second, outer feedback loop is used to control the variations of the controller parameters. A subclassification of adaptive controllers is the predictive controller that uses some adaptive model to predict the future behavior at some fixed time ahead, known as the control horizon, and determines the appropriate control action based upon the predicted future behavior.

The control algorithm may also be characterized in terms of the mathematical structure of the control law. If the control input is a linear combination of the error and its derivatives (or of the state variables or measured variables) the controller is said to be a linear controller and the coefficients used to construct this linear combination are known as the controller gains. Otherwise, the controller is said to be a nonlinear controller.

The manner in which the control input is computed also gives rise to a taxonomy. For many complex systems, multiple inputs exist. For example, to control the virtual aerodynamic shape of an aerodynamic surface (such as a wing), it may be necessary to have a large number of individual activatable flow effectors. If all of the different inputs are computed en masse in an individual process, the controller is said to be a centralized controller. If each of the individual inputs or distinct groups of inputs are determined via independent processes, the controller is known as a distributed or decentralized controller. Note that this nomenclature refers to the architecture of the control system, not the process or system itself, it is possible to design a centralized controller for a distributed system such as a large number of actuators distributed over the surface of an aerodynamic surface. A centralized control algorithm is typically much easier to design and implement than a distributed one, unfortunately, these algorithms are sometimes executed on an single processor and hence there is a limit to the number of inputs that may be effectively controlled in order to control the missile or aircraft in real-time. Another disadvantage of centralized control systems is the difficulty of running control lines for distributed actuators (flow effectors) and/or sensors back to a single control system. Distributed algorithms, on the other hand, may be executed on multiple processors simultaneously and hence can be scaled to accommodate large numbers of inputs. It must be clarified, also, that this nomenclature refers to the algorithm itself, not the hardware upon which it is executed. With a distributed controller, it is possible to execute several independent processes on an individual processor simultaneously and hence, a one to one correlation between processes and processors is not a requirement for a distributed control system.

Finally, within a control system, a classification is required to describe its hierarchy. If a control system regulates the behavior of only a portion of the system, it is called a local controller. The local controller manages the airflow control zone(s) or the individual flow effectors. Conversely, if the control system is responsible for controlling the entire system, it is a global controller. It is possible to have a distributed global control system. In this case, a set of distributed, local controllers may comprise the global controller for the entire system. Often, local controllers may be combined with a global controller to form a hierarchical control system. In this case, an outer control loop may be constructed to coordinate the behaviors of local controllers. This outer most loop is commonly referred to as the global controller within the context of a hierarchical control system. It is not necessary that the global controller be a classical feedback system, it may be an expert system, a fuzzy logic system or a simple rule base. In addition, nontraditional approaches may also be used such as artificial neural networks may be used as a global controller. If a closed loop feedback controller is used as a global controller, any local feedback loops present are known as minor feedback loops. It is also possible that the hierarchical control system possesses more than two layers, minor feedback loops can themselves have minor feedback loops and a local controller may coordinate even more localized controllers. For example, an airplane may have a global control system that controls two wings, each of the wings may have a local controller that in turn coordinates the behavior of multiple flow effectors on the surface of the wing, each of which are regulated by its own local controller.

FIGS. 1 through 29 are flow diagrams outlining a number of embodiments of the control structure or portions thereof that is programmed or designed into the one or more logic devices. While many of the control structures are used to control individual flow effectors. These structures are also envisioned to control airflow control zones with multiple flow effectors, which includes active flow control devices or activatable flow effectors and traditional flow control surfaces.

FIG. 1 is a flow diagram for a fixed, cascade controller 210 for local control of an individual flow effector. An input command 212 is specified in some manner, usually from the global control system (not shown). This control input is then compared with some measured output of the effect of the flow effector such as a down stream pressure measurement and an error 214 (and possibly derivatives and integrals of the error) is computed. Based upon the computed error, an input to the flow effector is determined 216 and input 218. The effect of this actuation is measured and returned for comparison 220 with the input command. Note, this is not necessarily a discrete event algorithm, it may be continuous or a digital approximation to a continuous process. The input command may be a continuously varying signal or its digital analog, or a discrete signal.

Figure 2:
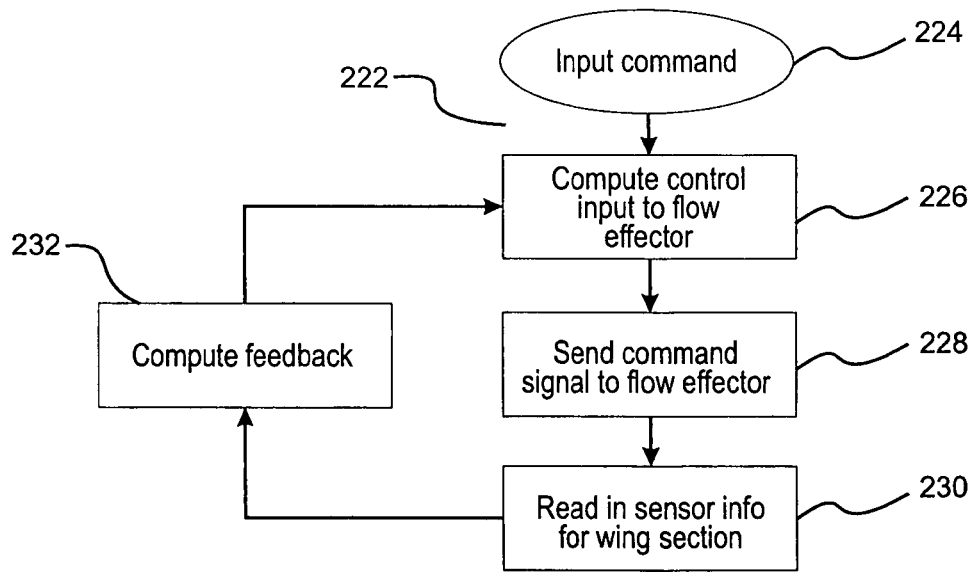
FIG. 2. Flow diagram for a fixed, output feedback controller for local control of an individual active flow control device or activatable flow effector.

FIG. 2 is a flow diagram for a fixed, output feedback controller 222 for local control of an individual flow effector. An input command 224 is specified in some manner, usually from some global control system (not shown). This control input is then augmented by some computed feedback input 226 based upon some measured output from the flow effector such as a down stream pressure. The augmented input is then used to drive the flow effector 228. The effect of this actuation is measured 230 and passed to a control law 232 for computation of the feedback signal. Note, this is not necessarily a discrete event algorithm, it may be continuous or a digital approximation to a continuous process. The input command may be a continuously varying signal or its digital analog, or a discrete signal.

Figure 3:
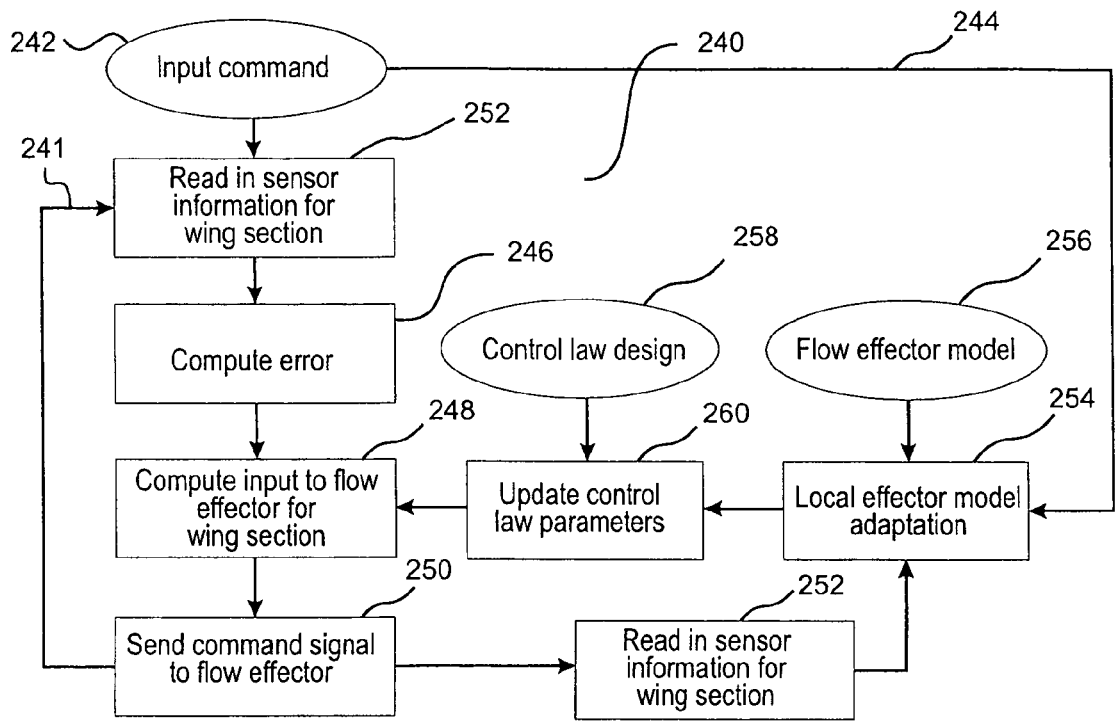
FIG. 3. Flow diagram for an adaptive, cascade controller for local control of an individual active flow control device or activatable flow effector.

FIG. 3 is a flow diagram for an adaptive, cascade controller 240 for local control of an individual flow effector. An input command 242 is specified in some manner, usually from some global control system (not shown) to both an inner loop 241 that determines the input to the flow effector and to an outer loop 244 that determines the control law used to compute the flow effector input. The inner and outer loops run concurrently, though the processing rates for the two loops need not be the same. In the inner loop, the control input is compared with some measured output 246 from the flow effector such as a down stream pressure and an error (and possibly derivatives and integrals of the error) is computed. Based upon the computed error 246, an input to the flow effector is determined 248 and input 250. The effect of this actuation is measured and returned for comparison 252 with the input command. Concurrently, the output is also passed to the outer loop 252. The outer loop uses the input 242 and corresponding output to determine the accuracy of the model 254 used for the control law design. Both the structure of the system model 256 and the control law design process 258 are also inputs to the adaption scheme used in the outer loop. Based upon the measure of model accuracy, the control law is adapted 260. Several mechanisms are available for use in control law adaption such as system identification based schemes and stability law schemes. Note, this is not necessarily a discrete event algorithm, it may be continuous or a digital approximation to a continuous process. The input command may be a continuously varying signal or its digital analog, or a discrete signal.

Figure 4:
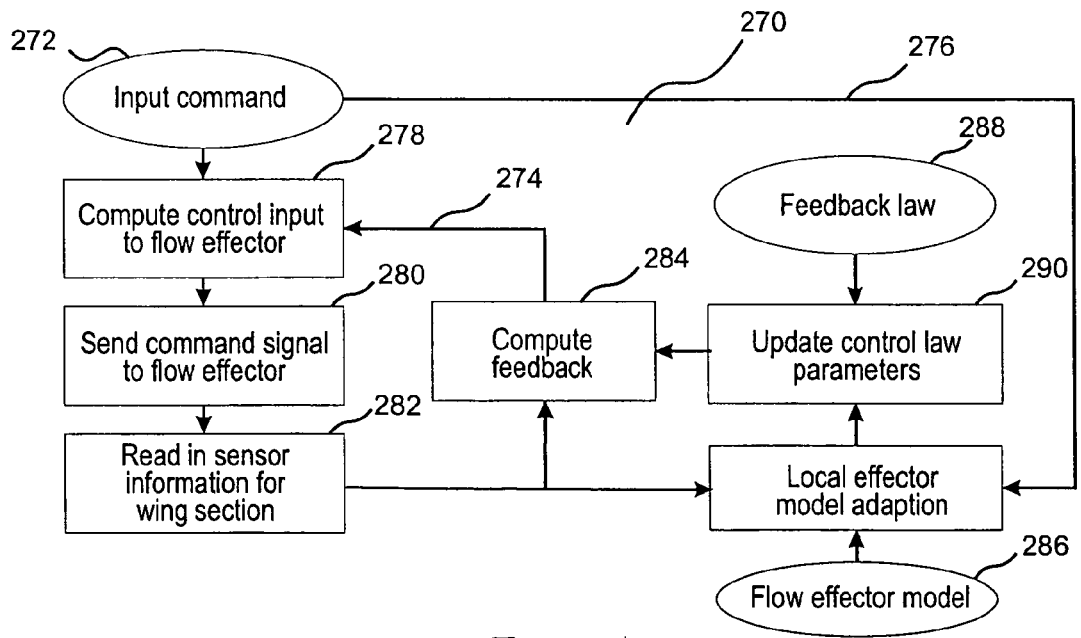
FIG. 4. Flow diagram of an adaptive, output controller for local control of an individual active flow control device or activatable flow effector.

FIG. 4 is a flow diagram for an adaptive, output feedback controller 270 for local control of an individual flow effector. An input command 272 is specified in some manner, usually from some global control system (not shown) to both an inner loop 274 that determines the input to the flow effector and to an outer loop 276 that determines the control law used to compute the flow effector input. The inner and outer loops run concurrently, though the processing rates for the two loops need not be the same. In the inner loop 274, the control input is then augmented by some computed feedback input 278 based upon some measured output from the flow effector such as a down stream pressure. The augmented input is then used to drive 280 the flow effector. The effect of this actuation is measured 282 and passed to a control law 284 for computation of the feedback signal. Concurrently, the output 282 is also passed to the outer loop 276. The outer loop 276 uses the input 272 and corresponding output 282 to determine the accuracy of the model used for the control law design. Both the structure of the system model 286 and the control law design process 288 are also inputs to the adaption scheme used in the outer loop. Based upon the measure of model accuracy, the control law is adapted 290. Several mechanisms are available for use in control law adaption such as system identification based schemes and stability law schemes. Note, this is not necessarily a discrete event algorithm, it may be continuous or a digital approximation to a continuous process. The input command may be a continuously varying signal or its digital analog, or a discrete signal.

Figure 5:
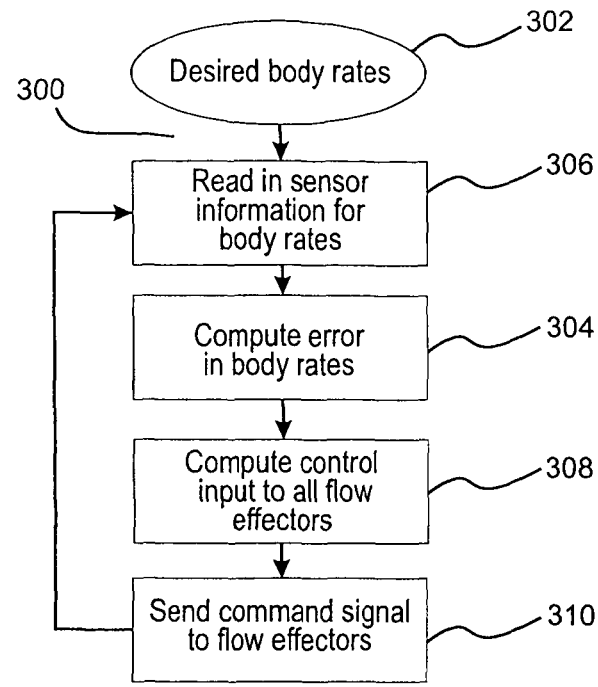
FIG. 5. Flow diagram of a fixed, cascade controller for global control of an aircraft or missile.

FIG. 5 is a flow diagram for a fixed, cascade controller 300 for global control of an aircraft or missile. An input command 302 is specified in some manner, usually from some global control system, e.g., desired body rates from an autopilot or a human operator. This control input 302 is then compared 304 with some measured output 306 from the aircraft or missile such as the aircraft body rates (roll, pitch and yaw), and an error (and possibly derivatives and integrals of the error) is computed 304. Based upon the computed error, an input 308 to all of the flow effectors is determined and input 310. The effect of this actuation is measured 306 and returned for comparison with the input command 304. Note, this is not necessarily a discrete event algorithm, it may be continuous or a digital approximation to a continuous process. The input command may be a continuously varying signal or its digital analog, or a discrete signal.

Figure 6:
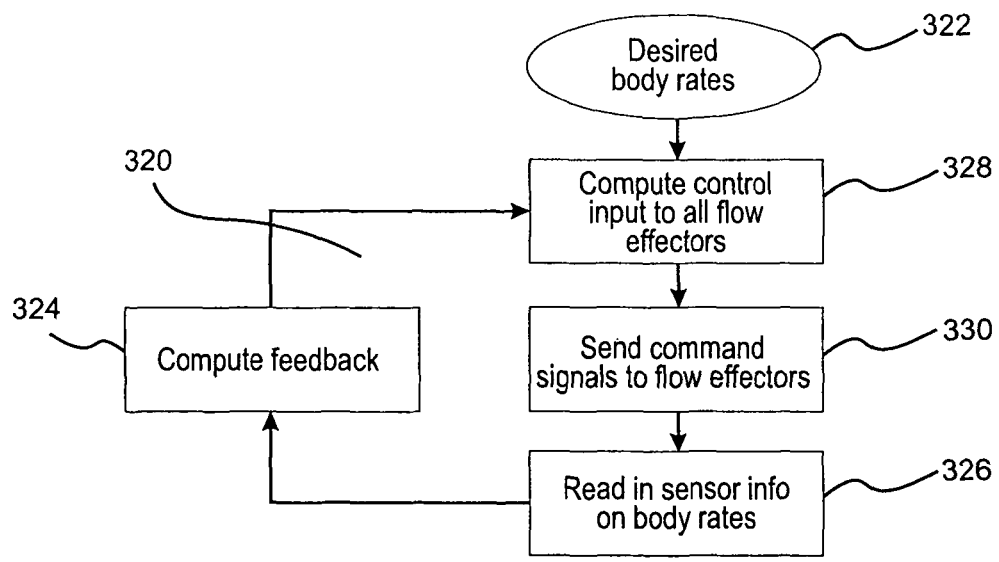
FIG. 6. Flow diagram of a fixed, output controller for global control of an aircraft or missile.

FIG. 6 is a flow diagram for a fixed, output feedback controller 320 for global control of an aircraft or missile. An input command 322 is specified in some manner, usually from some global control system. This control input 322 is then augmented 328 by some computed feedback input 324 based upon some measured output from the aircraft 326 such as the aircraft body rates (roll, pitch and yaw). The augmented input 330 is then used to drive all of the flow effectors. The effect of this actuation is measured 326 and passed to a control law for computation of the feedback signal. Note, this is not necessarily a discrete event algorithm, it may be continuous or a digital approximation to a continuous process. The input command may be a continuously varying signal or its digital analog, or a discrete signal.

Figure 7:
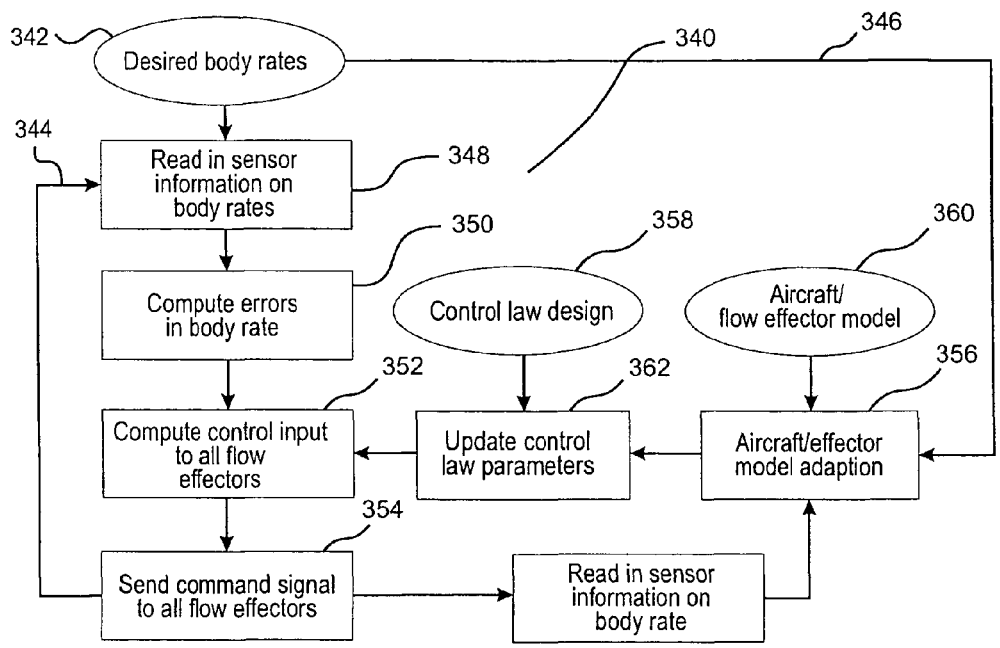
FIG. 7. Flow diagram of an adaptive, cascade controller for global control of an aircraft or missile.

FIG. 7 is a flow diagram for an adaptive, cascade controller 340 for global control of an aircraft or missile. An input command 342 is specified in some manner, usually from some global control system to both an inner loop 344 that determines the input to the flow effector and to an outer loop 346 that determines the control law used to compute the flow effector input. The inner 344 and outer 346 loops run concurrently, though the processing rates for the two loops need not be the same. In the inner loop, the control input is compared with some measured output 348 from the aircraft or missile such as the aircraft or missile body rates (roll, pitch and yaw), and an error (and possibly derivatives and integrals of the error) is computed 350. Based upon the computed error 350, the input to all of the flow effectors is determined 352 and input 354. The effect of this actuation is measured and returned 348 for comparison with the input command 342. Concurrently, the output 354 is also passed to the outer loop 346. The outer loop 346 uses the input 342 and corresponding output 354 to determine the accuracy 356 of the model used for the control law design 358. Both the structure of the system model 360 and the control law design 358 process are also inputs to the adaption scheme used in the outer loop. Based upon the measure of model accuracy, the control law is adapted and updated 362. Several mechanisms are available for use in control law adaption such as system identification based schemes and stability law schemes. Note, this is not necessarily a discrete event algorithm, it may be continuous or a digital approximation to a continuous process. The input command may be a continuously varying signal or its digital analog, or a discrete signal.

Figure 8:
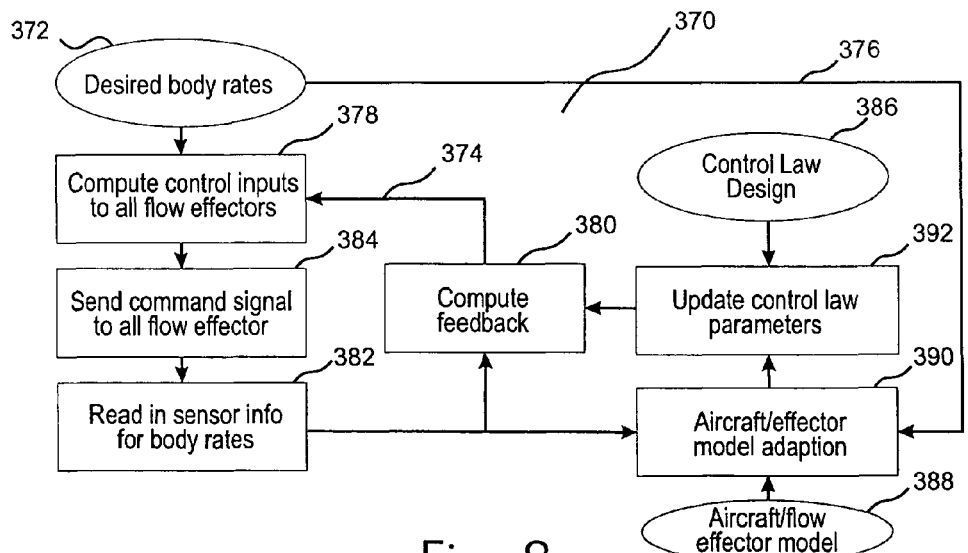
FIG. 8. Flow diagram of an adaptive, output feedback controller for global control of an aircraft or missile.

FIG. 8 is a flow diagram for an adaptive, output feedback controller 370 for global control of an aircraft or missile. An input command 372 is specified in some manner, usually from some global control system (not shown) to both an inner loop 374 that determines the input to the flow effector and to an outer loop 376 that determines the control law used to compute the flow effector input 378. The inner 374 and outer loops 376 run concurrently, though the processing rates for the two loops need not be the same. In the inner loop 374, the control input 372 is then augmented 378 by some computed feedback input 380 based upon some measured output 382 from the aircraft or missile such as the aircraft or missile body rates (roll, pitch and yaw). The augmented input 378 is then used to drive 384 all of the flow effectors. The effect of this actuation is measured and passed to a control law for computation of the feedback signal. Concurrently, the output 382 is also passed to the outer loop 376. The outer loop 376 uses the input 372 and corresponding output 382 to determine the accuracy of the model used for the control law design 386. Both the structure of the system model 388 and the control law design 386 process are also inputs to the adaption scheme 390 used in the outer loop. Based upon the measure of model accuracy, the control law is adapted and updated 392. The updated control parameters are then impact the inner loop 374 by changing the computation of feedback 380. Several mechanisms are available for use in control law adaption such as system identification based schemes and stability law schemes. Note, this is not necessarily a discrete event algorithm, it may be continuous or a digital approximation to a continuous process. The input command may be a continuously varying signal or its digital analog, or a discrete signal.

Figure 9:
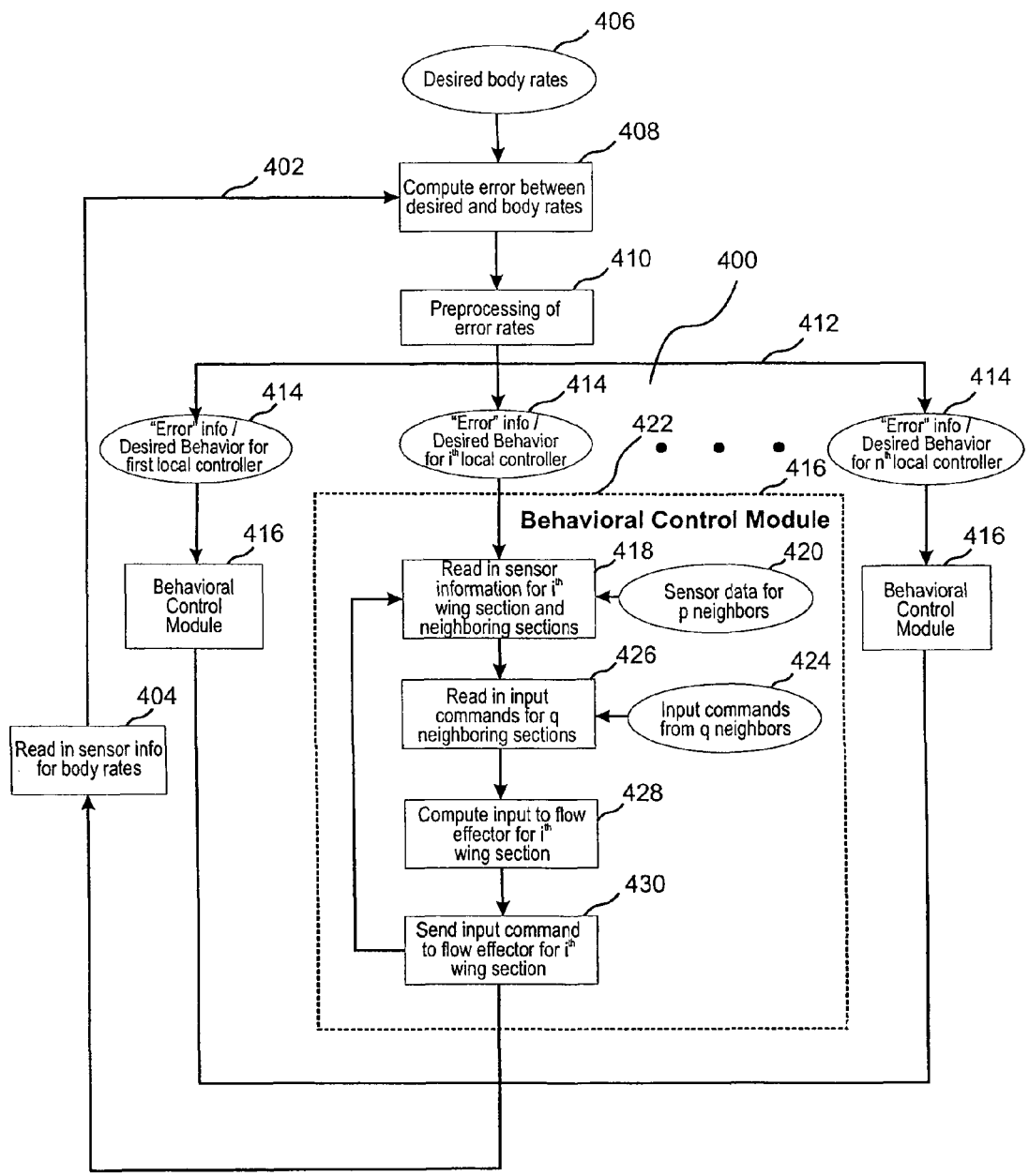
FIG. 9. Flow diagram of an aircraft or missile hierarchical control system with a distributed global controller.

FIG. 9 is a flow diagram for a hierarchical control system 400 with a distributed global controller. In the outer loop 402, measured body rates 404 are compared 408 with some specified desired body rates 406 (position, velocity, orientation . . . ). The desired body rates 406 (position, velocity, orientation . . . ) may be specified by another control system such as for example an autopilot (not shown), by a human operator (not shown), or a pilot (not shown). Any preprocessing 410 of the input and feedback data, such as computation of rate errors is performed next and passed 412 to all of the distributed processes that comprise the global control system for the aircraft via a bus. Based upon this global information, the distributed controller determines the appropriate local behavior and passes corresponding commands 414 to associated behavioral control modules 416. Note that each of these independent processes is associated with at least one behavioral control module 416. The behavioral control module shown here, examines sensor data 418 from both itself 422 and from 0 to p neighbors 420, where p is any positive integer up to the number of flow control zones, and polls 426 the neighbors to determine what actions its neighbors are taking 424. The behavioral control modules 416 associated with the other input commands has not been expanded as it has for the ith local controller 422. The content of these behavioral control modules 416 is identical to that of the one shown for the ith behavioral control module 422. Based upon the desired behavior and the information 418, 426 determined from its neighbors, an input to the local flow effector is computed 428 and applied 430. In essence, the behavioral control module is a local controller that uses only local information to determine input to the flow effectors though the definition of local information is extended to possibly include input/output information from neighboring behavioral control modules. It must be noted that the neighboring behavioral control modules are not necessary adjacent modules but may be aerodynamically coupled in some manner. It is also noteworthy that the local control algorithm used within the behavioral control module is not constrained to be a traditional feedback control system but may also be a non-traditional control algorithm such as an expert system, a swarm intelligence-based algorithms or neural reflex. The net effect of the actuation from all of the flow effectors is then measured via sensor and passed back for comparison with the desired body rates (position, velocity, orientation . . . ).

Figure 10:
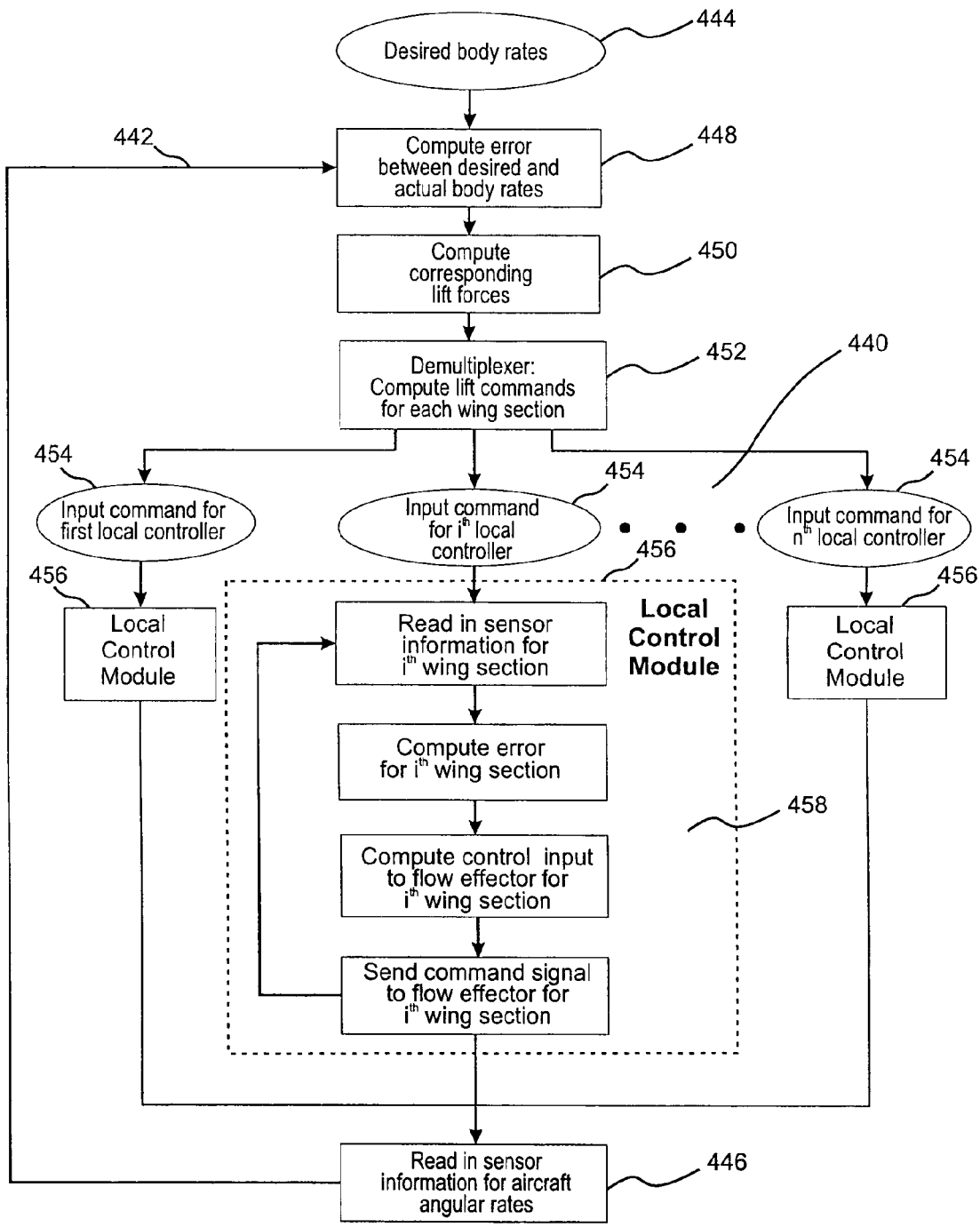
FIG. 10. Flow diagram of an aircraft or missile hierarchical control system with a centralized, cascade global controller with minor loop cascade feedback loops for local control of individual activatable flow effectors.

FIG. 10 is a flow diagram for a hierarchical control system with a centralized, cascade global controller with minor loop cascade feedback loops for local control of the individual flow effectors 440. In the outermost loop 442, a desired set of body rates 444 (position, velocity, orientation . . . ) is specified either by another control system such as an autopilot (not shown), a human operator (not shown) or pilot (not shown) and compared 448 with the sensed body rates 446 (position, velocity, orientation . . . ) of the aircraft or missile. The controller determines 450 the appropriate behavior such as desired lift for each airflow control zone 452 and transmits 454 these behaviors as commands to each of the local, minor loop feedback controllers 456. The local controller 456 shown here is identical to that shown in FIG. 1 and operates in precisely the same manner to produce the appropriate actuator input. The local control modules associated with the other input commands has not been expanded as it has for the ith local controller 458. The content of these local controllers is identical to that of the one shown for the ith local control module. The net effect of the actuation from all of the flow effectors is then measured via sensors and passed back for comparison with the desired body rates (position, velocity, orientation . . . ).

Figure 11:
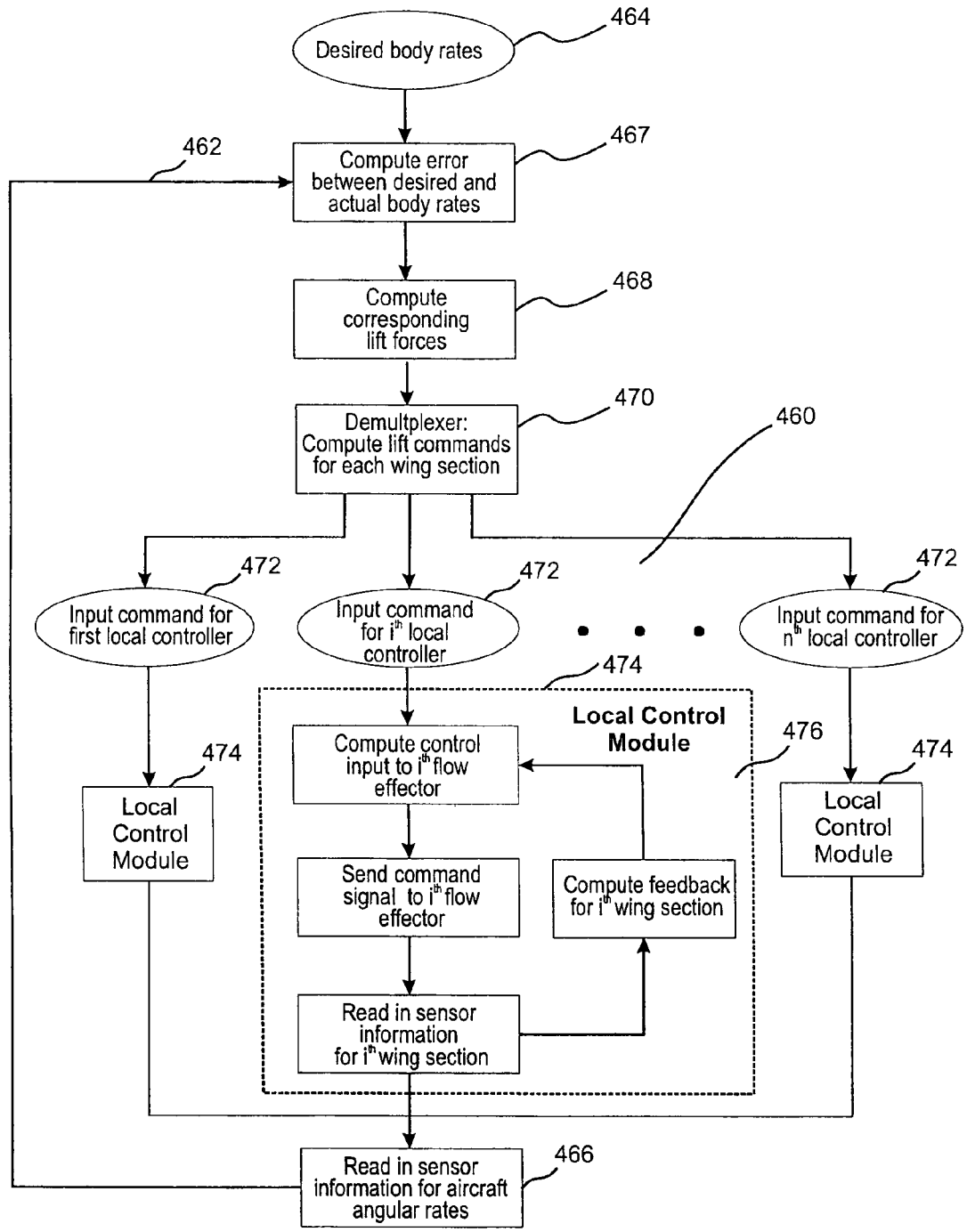
FIG. 11. Flow diagram of an aircraft or missile hierarchical control system with a centralized, cascade global controller with minor loop output feedback loops for local control of individual active flow control device or activatable flow effectors.

FIG. 11 is a flow diagram for a hierarchical control system with a centralized, cascade global controller with minor loop output feedback loops for local control of the individual flow effectors 460. In the outermost loop 462, a desired set of body rates 464 (position, velocity, orientation . . . ) is specified either by another control system such as an autopilot (not shown), a human operator (not shown), or pilot (not shown) and compared 467 with the sensed body rates 466 (position, velocity, orientation . . . ) of the aircraft or missile. The controller 468 determines the appropriate behavior such as desired lift for each airflow control zone 470 and transmits 472 these behaviors as commands to each of the local, minor loop feedback controllers 474. The local controller shown here is identical to that shown in FIG. 2 and operates in precisely the same manner to produce the appropriate actuator input. The local control modules 474 associated with the other input commands has not been expanded as it has for the ith local controller 476. The content of these local controllers 474 is identical to that of the one shown for the ith local control module 476. The net effect of the actuation from all of the flow effectors is then measured via sensor and passed back for comparison with the desired body rates (position, velocity, orientation . . . ).

Figure 12:
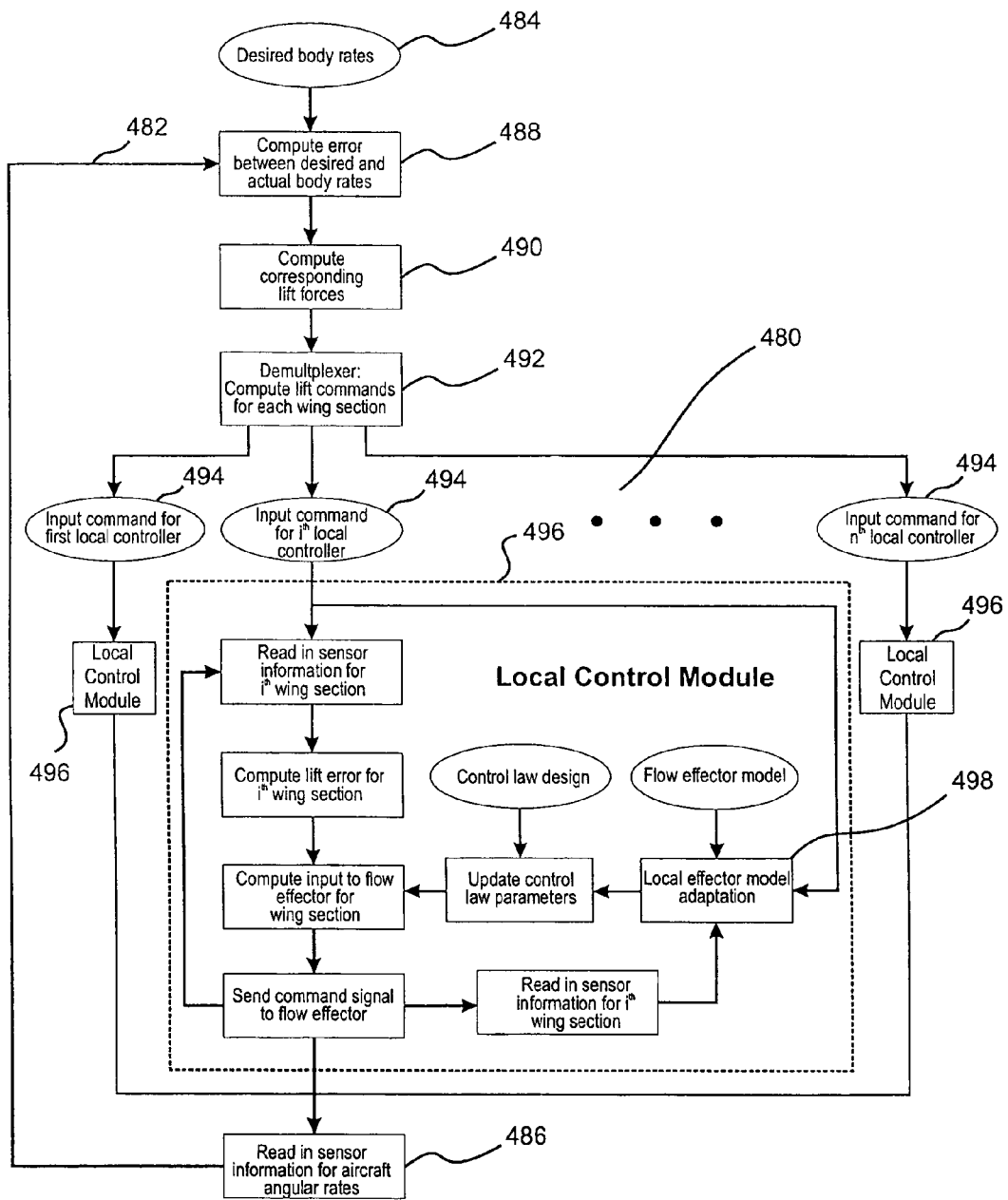
FIG. 12. Flow diagram of an aircraft or missile hierarchical control system with a centralized, cascade global controller with minor loop adaptive cascade feedback loops for local control of individual active flow control device or activatable flow effectors.

FIG. 12 is a flow diagram for a hierarchical control system with a centralized, cascade global controller with minor loop adaptive cascade feedback loops for local control of the individual flow effectors 480. In the outermost loop 482, a desired set of body rates 484 (position, velocity, orientation . . . ) is specified either by another control system such as an autopilot (not shown), a human operator (not shown) or pilot (not shown) and compared 488 with the sensed body rates 486 (position, velocity, orientation . . . ) of the aircraft or missile. The controller determines 490 the appropriate behavior such as desired lift from each airflow control zone 492 and transmits 494 these behaviors as commands to each of the local, minor loop feedback controllers 496. The local controller 496 shown here is identical to that shown in FIG. 3 and operates in precisely the same manner to produce the appropriate actuator input. The local control modules 496 associated with the other input commands has not been expanded as it has for the ith local controller 498. The content of these local controllers 496 is identical to that of the one shown for the ith local control module 498. The net effect of the actuation from all of the flow effectors is then measured via sensor and passed back for comparison with the desired body rates (position, velocity, orientation . . . ).

Figure 13:
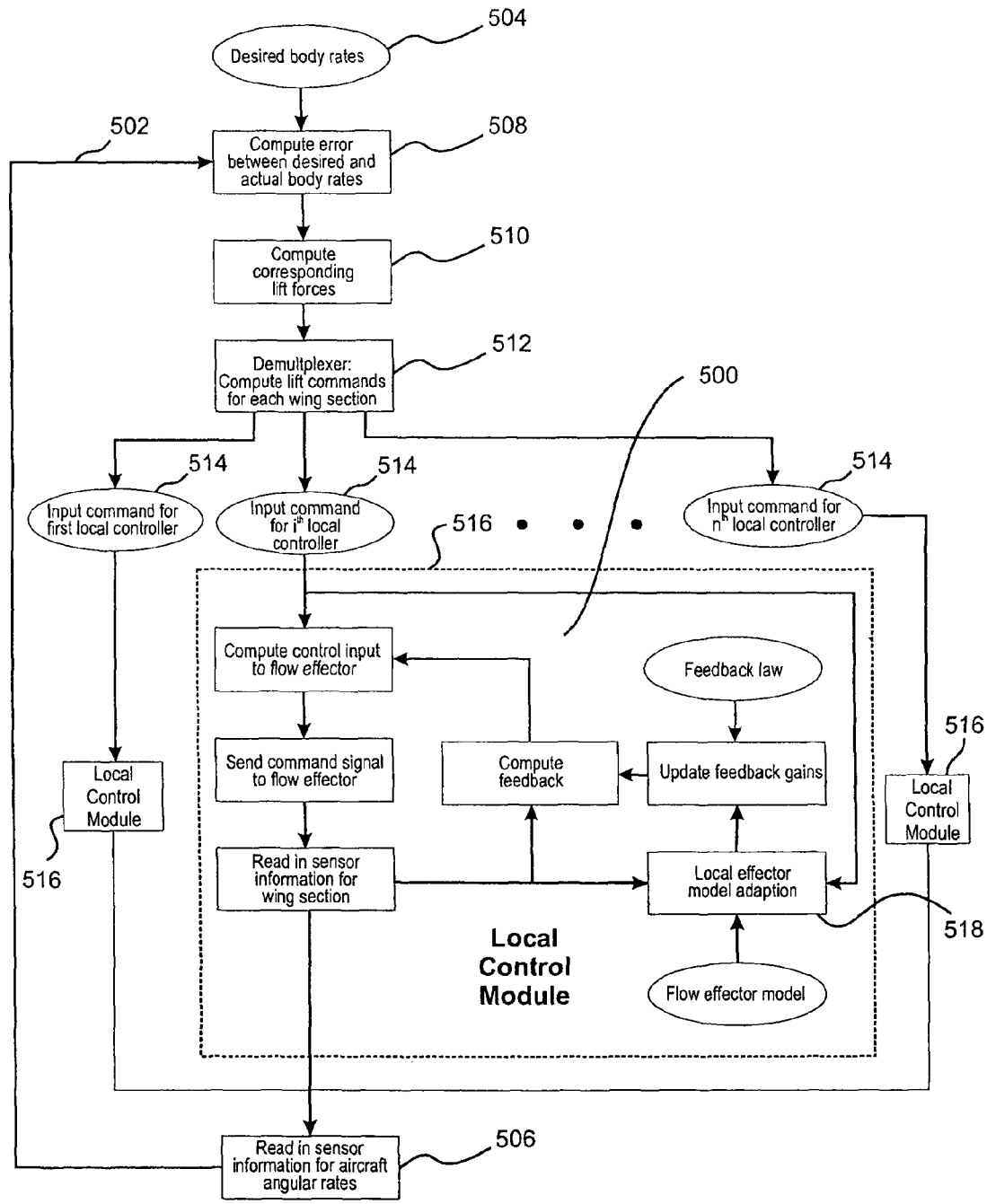
FIG. 13. Flow diagram of an aircraft or missile hierarchical control system with a centralized, cascade global controller with minor loop adaptive output feedback loops for local control of individual active flow control device or activatable flow effectors.

FIG. 13 is a flow diagram for a hierarchical control system with a centralized, cascade global controller with minor loop adaptive output feedback loops for local control of the individual flow effectors 500. In the outermost loop 502, a desired set of body rates 504 (position, velocity, orientation . . . ) is specified either by another control system such as an autopilot (not shown), a human operator (not shown) or pilot (not shown) and compared 508 with the sensed body rates 506 (position, velocity, orientation . . . ) of the aircraft or missile. The controller 510 determines the appropriate behavior such as desired lift for each airflow control zone 512 and transmits 514 these behaviors as commands to each of the local, minor loop feedback controllers 516. The local controller 516 shown here is identical to that shown in FIG. 4 and operates in precisely the same manner to produce the appropriate actuator input. The local control modules 516 associated with the other input commands has not been expanded as it has for the ith local controller 518. The content of these local controllers 516 is identical to that of the one shown for the ith local control module 518. The net effect of the actuation from all of the flow effectors is then measured via sensor and passed back for comparison with the desired body rates (position, velocity, orientation . . . ).

Figure 14:
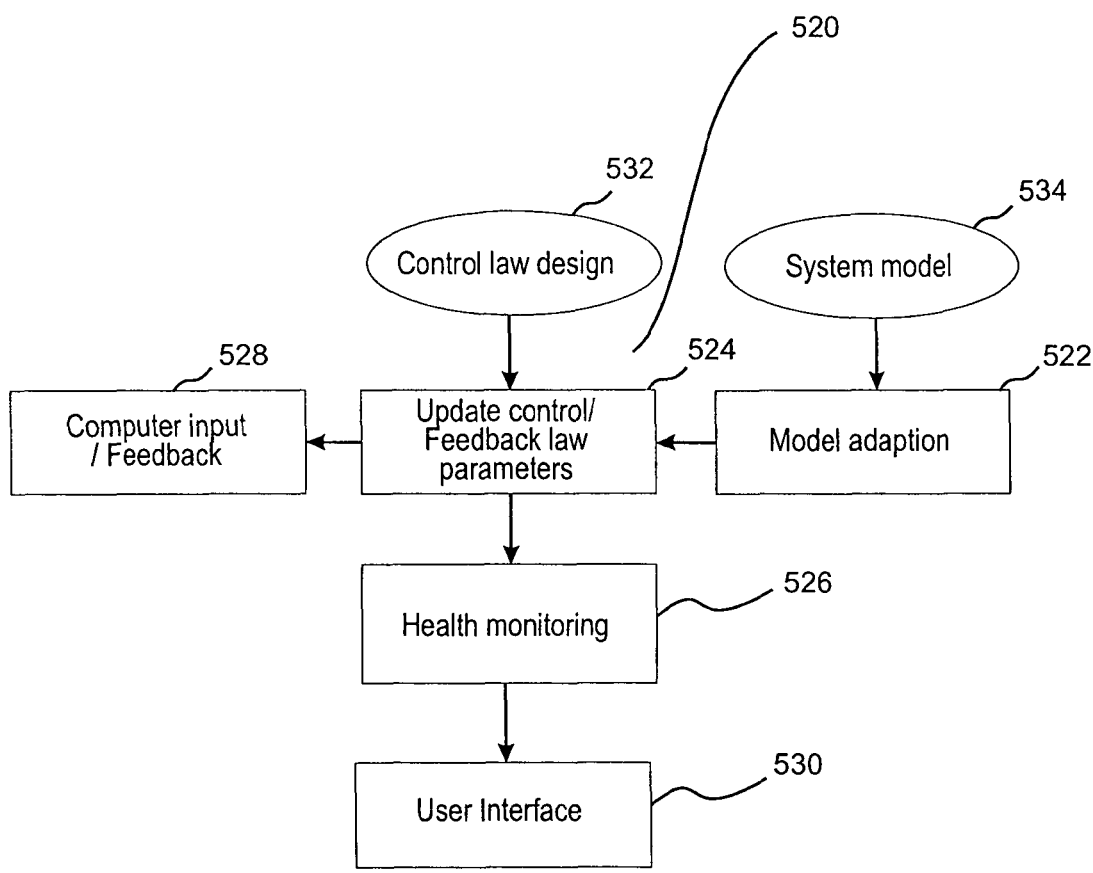
FIG. 14. Flow diagram for a airflow control system health monitoring system as it relates to computing feedback commands.

FIG. 14 is a flow diagram for a schematic of a health monitoring system 520 as it relates to computing feedback commands. The implementation of this health monitoring system with specific control schemes is shown in more detail in the following figures. The health monitoring scheme is an adjunct to control law adaption 522. As the adaption process involves detecting or at least implicitly detecting changes in the system, it is a natural place to monitor for systemic failures and degradation. The output of the adaption scheme is passed 524 to the health monitoring process 526 as well as to the control law computation 528. The health monitoring system 520 is composed of pattern recognition algorithms (not shown) including artificial neural networks, time/frequency analysis, wavelet analysis, fuzzy logic, etc., and a decision system (not shown) such as an expert system or fuzzy logic system. The output from the health monitoring system is passed to the user interface 530 for use by the automatic pilot (not shown), human operator (not shown) or pilot (not shown) of the aircraft or missile. In addition, the output of the health monitoring system can be passed to the adaption algorithm to provide a new control law design methodology 532 and updated system model 534 so that a "limp home" mode can be enabled for the aircraft that uses alternative actuation/sensing strategies for control. For example, the loss of full use of a flap may necessitate the use of skid to turn maneuvers instead of bank to turn maneuvers.

Figure 15:
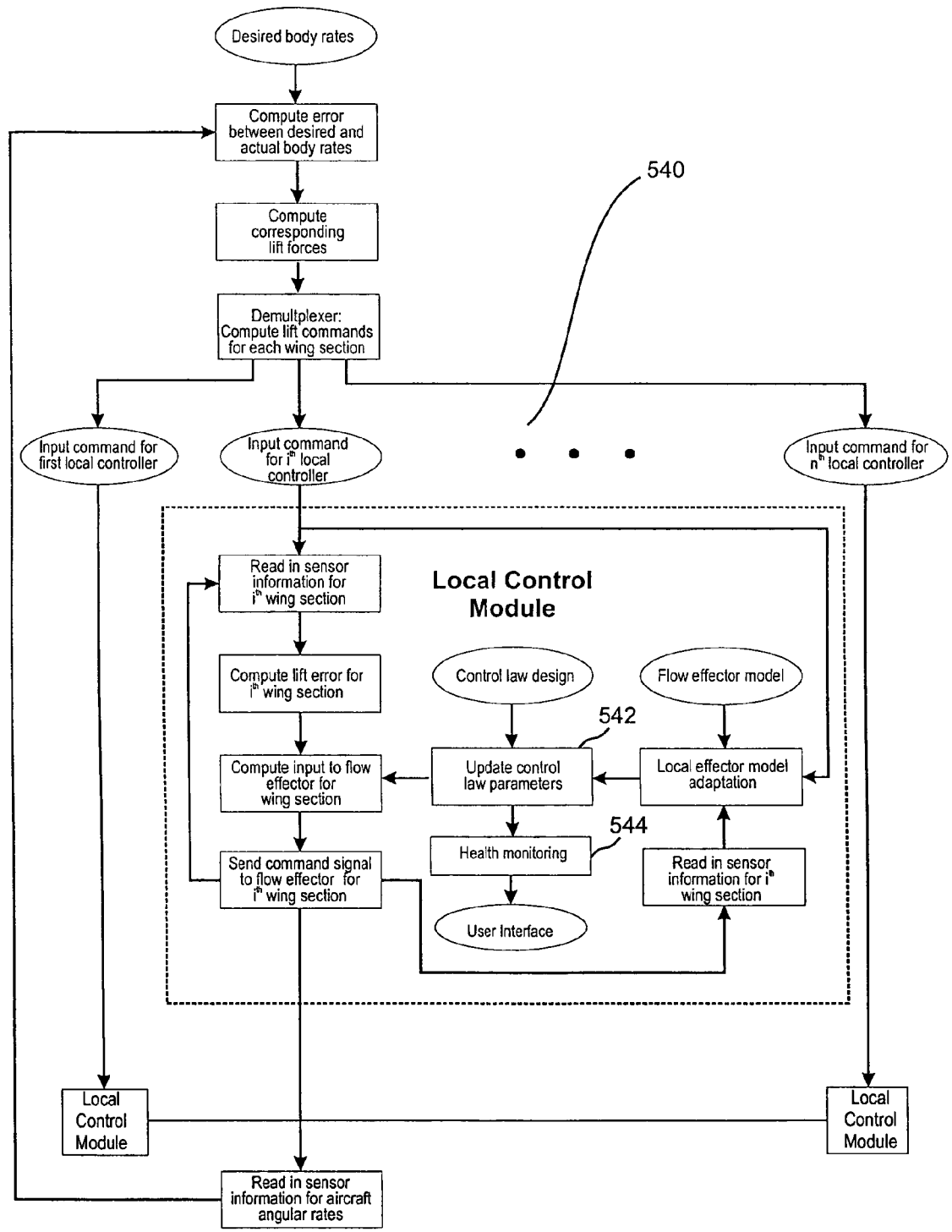
FIG. 15. Flow diagram for an aircraft or missile hierarchical control system with a centralized, cascade global controller with minor loop adaptive cascade feedback loops for local control of individual active flow control device or activatable flow effectors.

FIG. 15 is a flow diagram for a hierarchical control system 540 with a centralized, cascade global controller with minor loop adaptive cascade feedback loops for local control of the individual flow effectors that has been augmented with the health monitoring system shown in FIG. 14. This controller is identical to that shown in FIG. 12 and operates in precisely the same manner except that the adaption information 542 is made available to a global health monitoring system 544. Note that the scope of the health monitoring system is global though only an individual instance is shown for an individual local controller. The other local controllers shown in the figure have the same structure as the expanded controller shown for the ith local controller and the health monitoring system is the same, global system for each.

Figure 16:
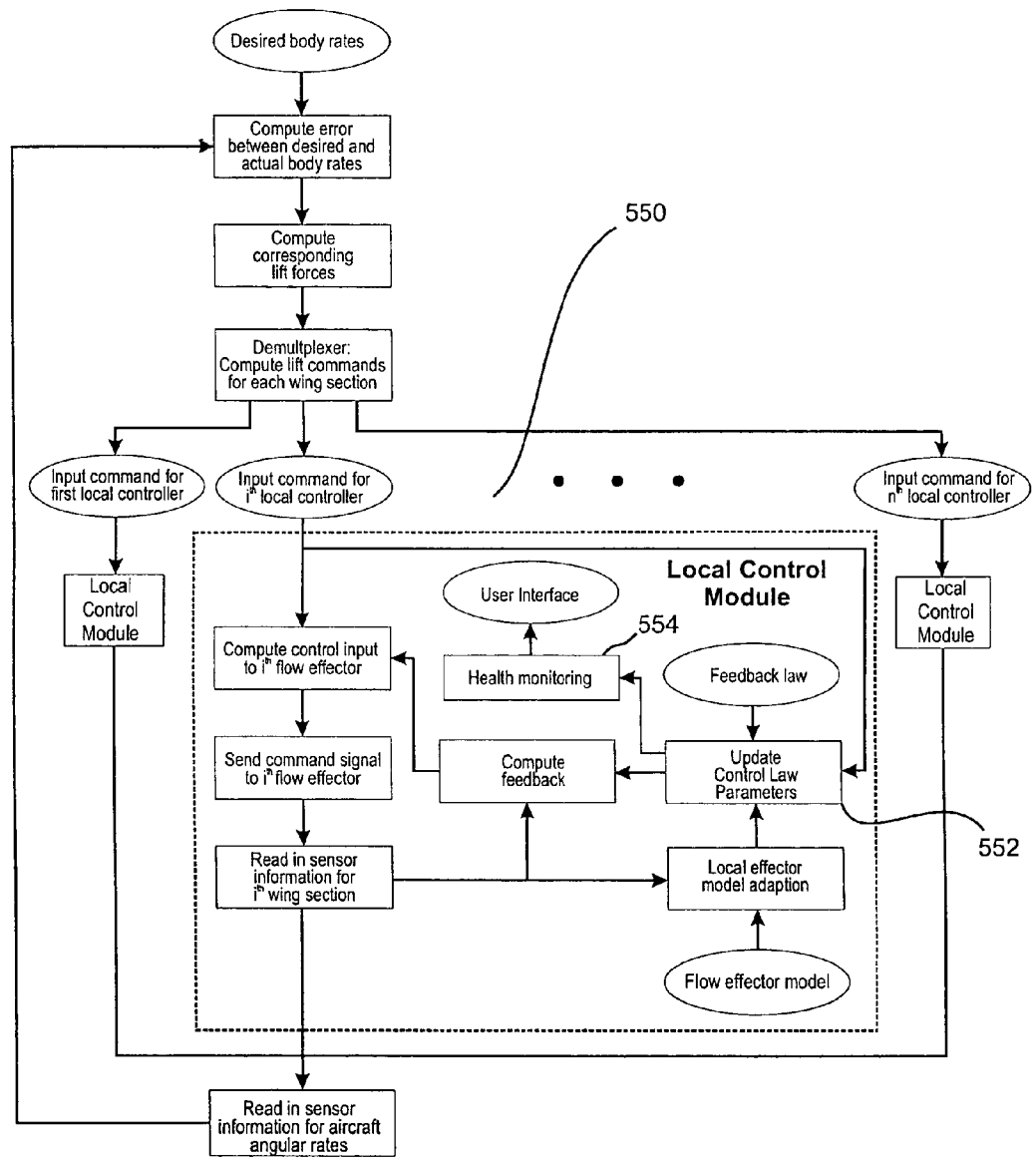
FIG. 16. Flow diagram for an aircraft or missile hierarchical control system with a centralized, cascade global controller with minor loop adaptive output feedback loops for local control of individual active flow control device or activatable flow effectors.

FIG. 16 is a flow diagram for a hierarchical control system 550 with a centralized, cascade global controller with minor loop adaptive output feedback loops for local control of the individual flow effectors that has been augmented with the health monitoring system shown in FIG. 14. This controller is identical to that shown in FIG. 13 and operates in precisely the same manner except that the adaption information 552 is made available to a global health monitoring system 554. Note that the scope of the health monitoring system is global though only an individual instance is shown for an individual local controller. The other local controllers shown in the figure have the same structure as the expanded controller shown for the ith local controller and the health monitoring system is the same, global system for each.

Figure 17:
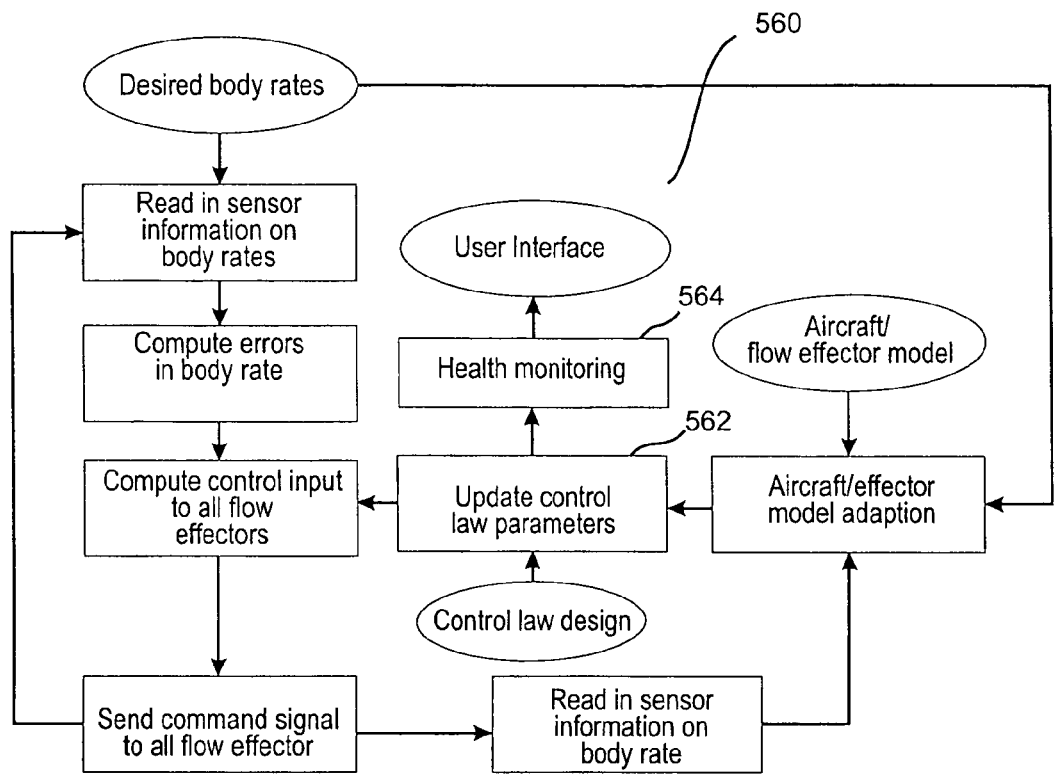
FIG. 17. Flow diagram for an adaptive, cascade controller for global control of a missile or aircraft that has been augmented with the health monitoring system shown in FIG. 14.

FIG. 17 is a flow diagram for an adaptive, cascade controller for global control of an aircraft or missile 560 that has been augmented with the health monitoring system shown in FIG. 14. This controller is identical to that shown in FIG. 7 and operates in precisely the same manner except that the adaption information 562 is made available to a global health monitoring system 564.

Figure 18:
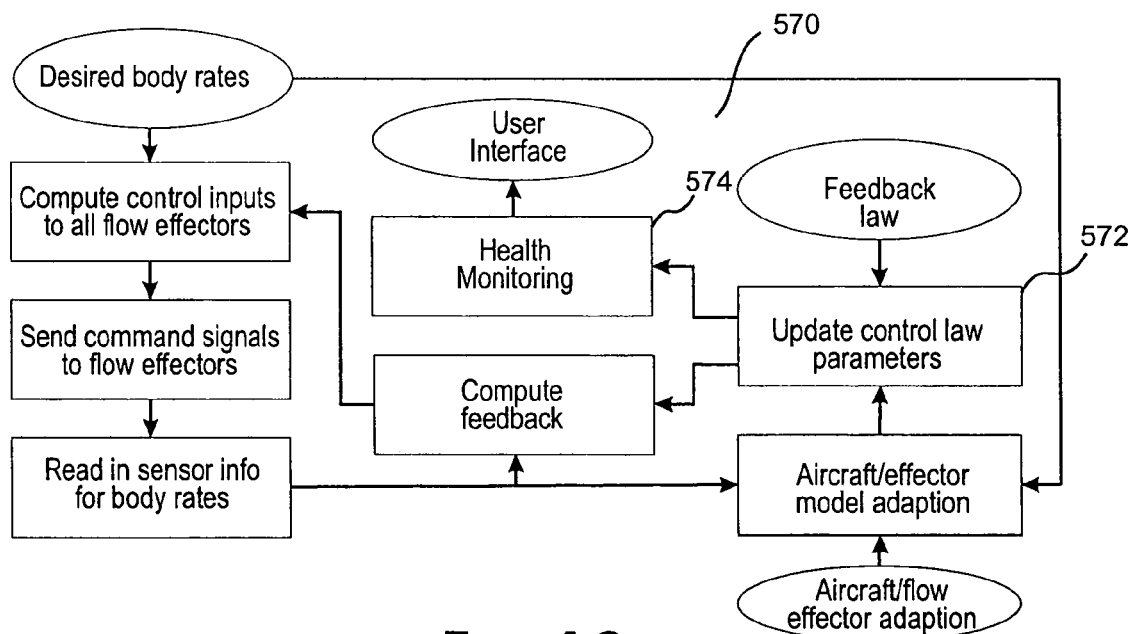
FIG. 18. Flow diagram for an adaptive, output controller for global control of a missile or aircraft that has been augmented with the health monitoring system shown in FIG. 14.

FIG. 18 is a flow diagram for an adaptive, output controller for global control of an aircraft or missile 570 that has been augmented with the health monitoring system shown in FIG. 14. This controller is identical to that shown in FIG. 8 and operates in precisely the same manner except that the adaption information 572 is made available to a global health monitoring system 574.

Figure 19:
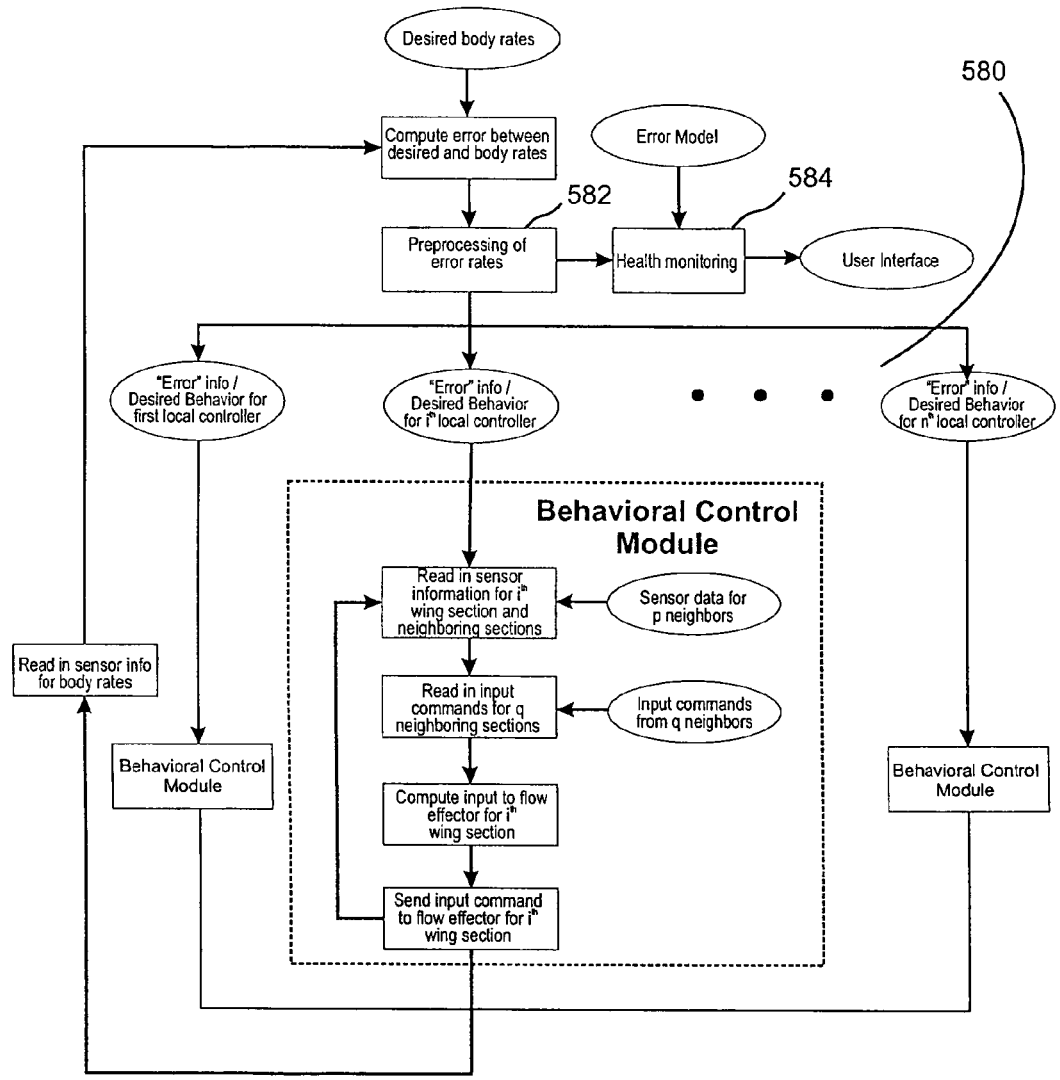
FIG. 19. Flow diagram for an aircraft or missile hierarchical control system with a distributed controller that has been augmented with the health monitoring system shown in FIG. 14.

FIG. 19 is a flow diagram for a hierarchical control system with a distributed global controller 580 that has been augmented with the health monitoring system shown in FIG. 14. This controller is identical to that shown in FIG. 9 and operates in precisely the same manner except that the pre-processing information 582 is made available to a global health monitoring system 584.

Figure 20:
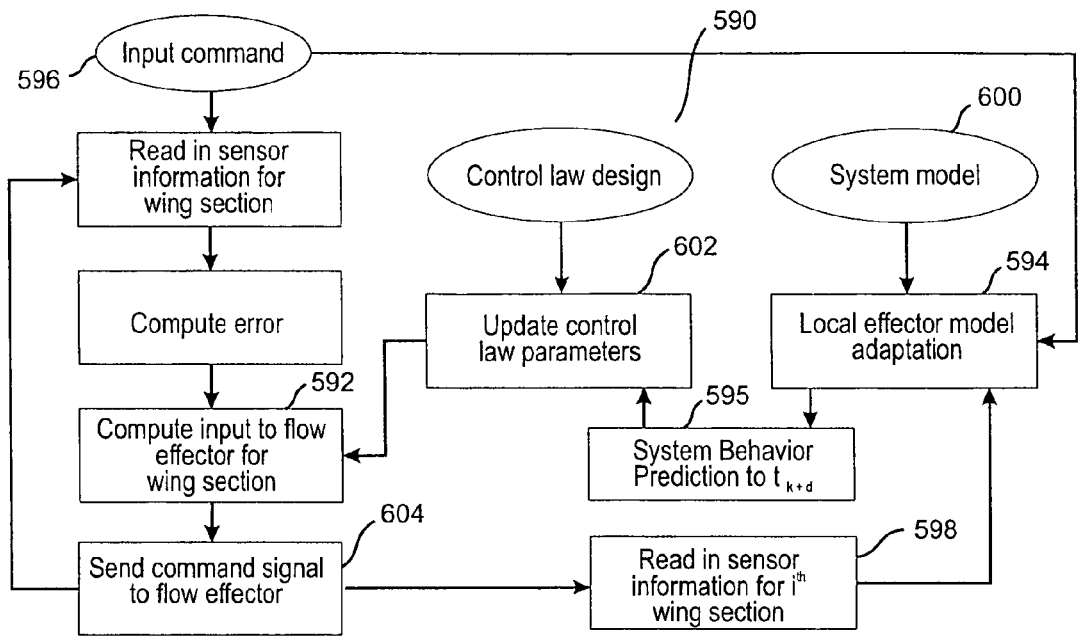
FIG. 20. Flow diagram for a predictive, adaptive cascade controller for local control of an individual active flow control device or activatable flow effector.

FIG. 20 is a flow diagram for a predictive adaptive, cascade controller for local control of an individual flow effector 590. The behavior of this control scheme is similar to that of the scheme depicted in FIG. 3 with the difference lying in the manner in which the control input 592 for the actuator is computed and the manner in which the control law is adapted 602. In the predictive adaptive scheme, the input/output 596, 598 information is used to identify, either implicitly or explicitly, changes in the system model 600. The updated model 594 is used to predict the behavior 595 of the system at future times up to some fixed future time increment known as the control horizon (d). Based upon the changes to the system model 600, the control law is adapted 602 and used to generate a series of input commands 592 that will drive the identified system to produce the desired output at the control horizon. The first of these input commands is used to drive the actuator 604. This is a digital control scheme and at each discrete time step, a complete series of input commands that will produce the desired result at the control horizon are generated though only the first of these commands is typically applied.

Figure 21:
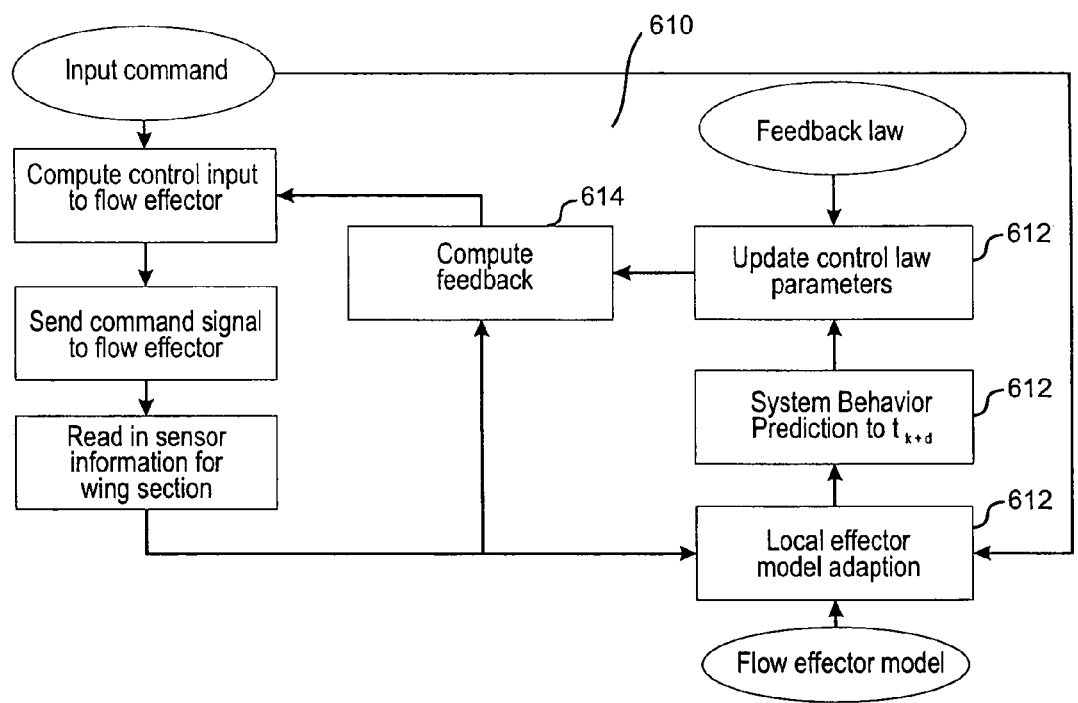
FIG. 21. Flow diagram for a predictive, adaptive output feedback controller for local control of an individual active flow control device or activatable flow effector.

FIG. 21 is a flow diagram for a predictive adaptive, output feedback controller for local control of an individual flow effector 610. The behavior of this control scheme is similar to that of the scheme depicted in FIG. 4. The difference between the system shown in FIG. 4 and this system is that the adaption mechanism 612 and control law computations 614 used are identical to that used in FIG. 20.

Figure 22:
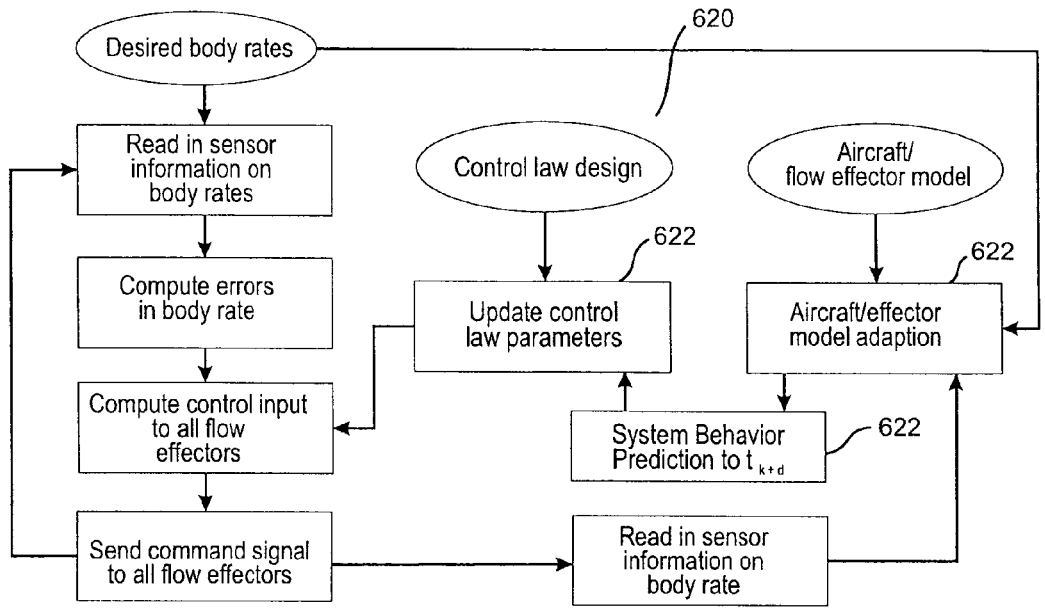
FIG. 22. Flow diagram for a predictive, adaptive, cascade controller for global control of an aircraft or missile.

FIG. 22 is a flow diagram for a predictive adaptive, cascade controller for global control of an aircraft or missile 620. The behavior of this control scheme is similar to that of the scheme depicted in FIG. 7 save that the predictive adaptive scheme shown in FIG. 20 is the adaption mechanism 622.

Figure 23:
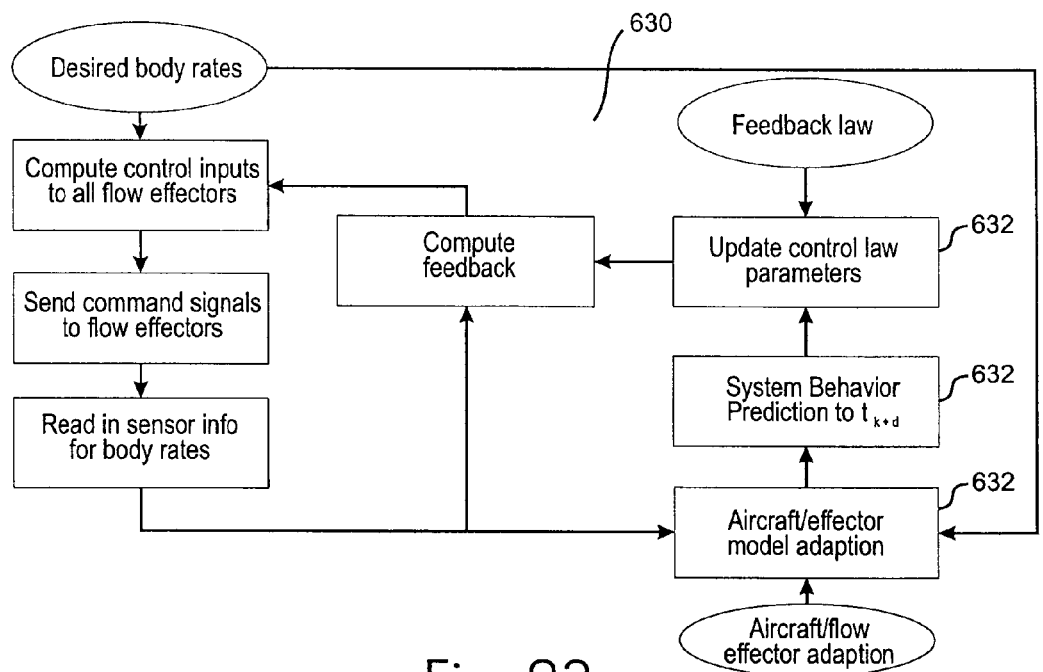
FIG. 23. Flow diagram for a predictive, adaptive, output feedback controller for global control of an aircraft or missile.

FIG. 23 is a flow diagram for a predictive adaptive, output feedback controller for global control of an aircraft or missile 630. The behavior of this control scheme is similar to that of the scheme depicted in FIG. 8 save that the predictive adaptive scheme shown in FIG. 20 is the adaption mechanism 632.

Figure 24:
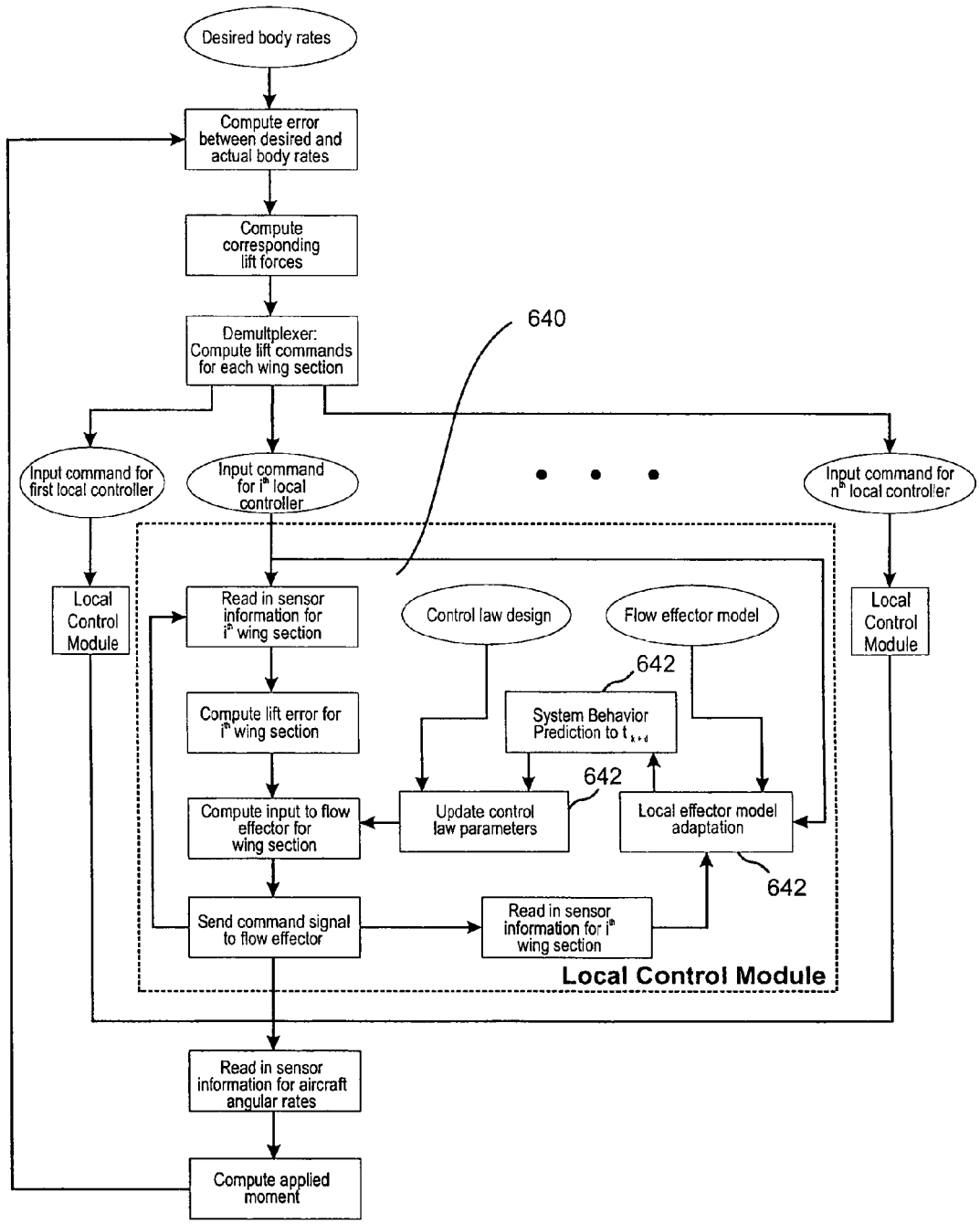
FIG. 24. Flow diagram for an aircraft or missile hierarchical control system with a centralized, cascade global controller with minor loop predictive adaptive cascade feedback loops for local control of the individual active flow control device or activatable flow effectors.

FIG. 24 is a flow diagram for a hierarchical control system with a centralized, cascade global controller with minor loop predictive adaptive cascade feedback loops for local control of the individual flow effectors 640. The behavior of this control scheme is similar to that of the scheme depicted in FIG. 12 save that the predictive adaptive scheme shown in FIG. 20 is the adaption mechanism 642 in the local control module.

Figure 25:
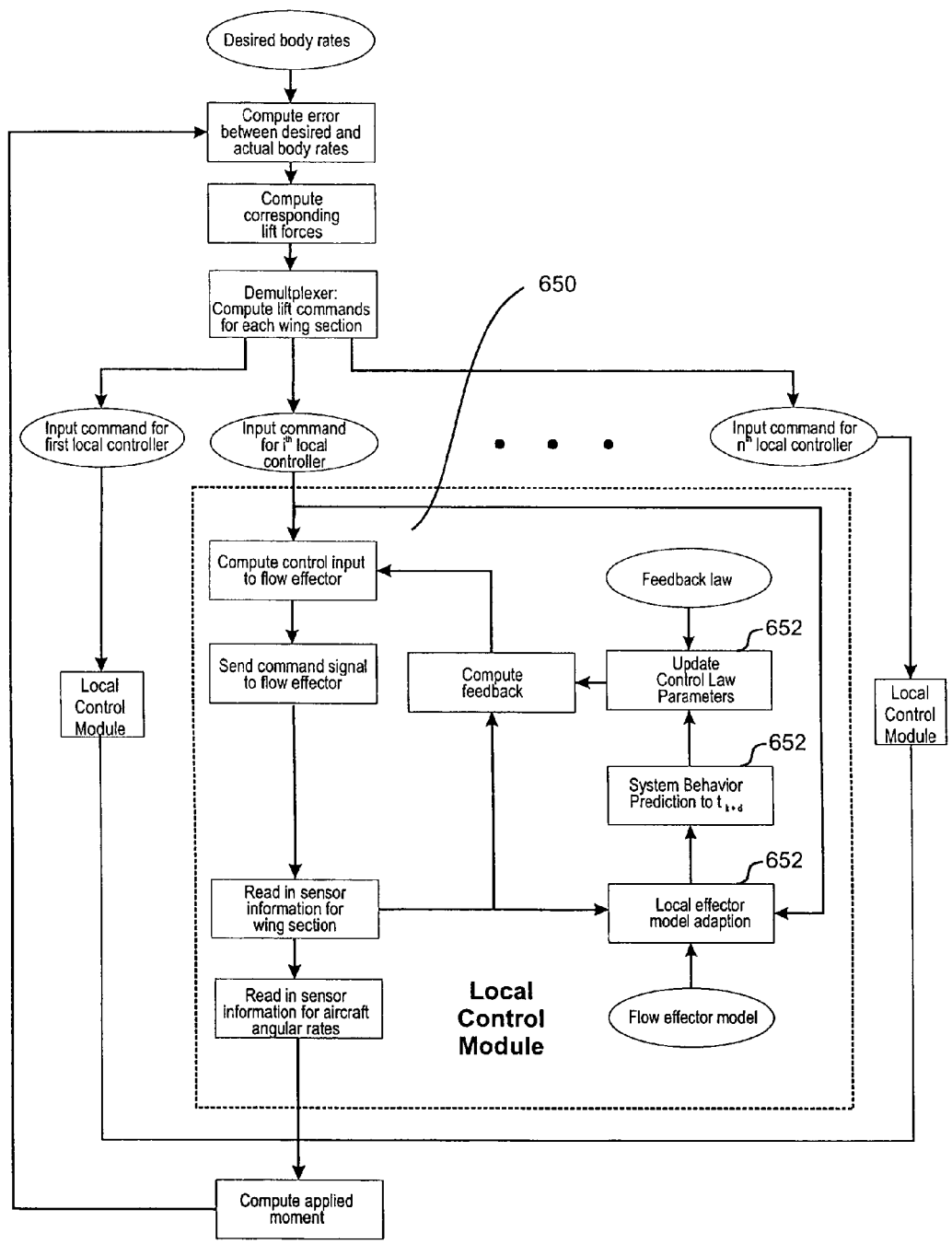
FIG. 25. Flow diagram for an aircraft or missile hierarchical control system with a centralized, cascade global controller with minor loop predictive adaptive output feedback loops for local control of the individual active flow control device or activatable flow effectors.

FIG. 25 is a flow diagram for a hierarchical control system with a centralized, cascade global controller with minor loop predictive adaptive output feedback loops for local control of the individual flow effectors 650. The behavior of this control scheme is similar to that of the scheme depicted in FIG. 13 save that the predictive adaptive scheme shown in FIG. 20 is the adaption mechanism 652 in the local control module.

Figure 26:
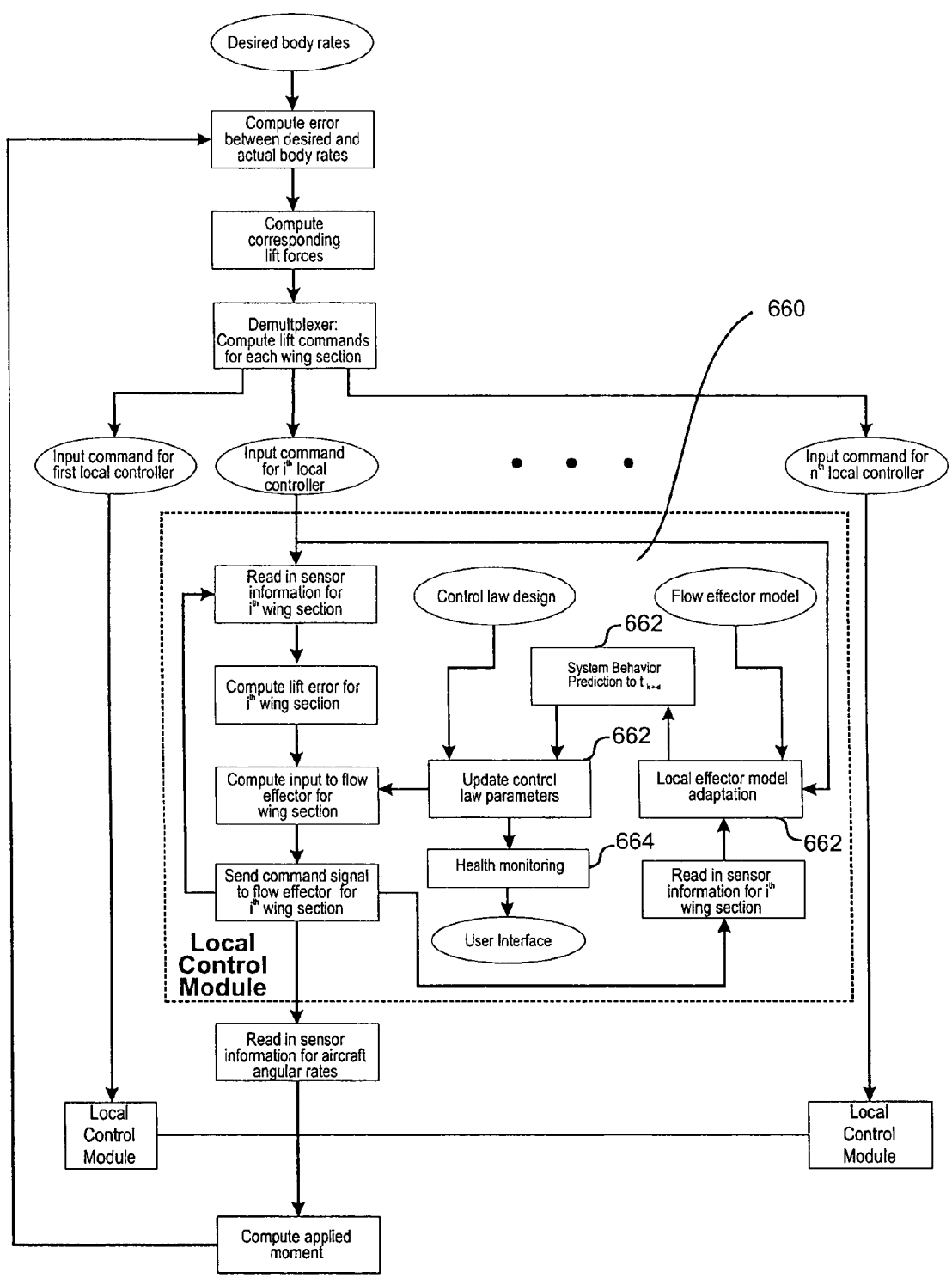
FIG. 26. Flow diagram for an aircraft or missile hierarchical control system with a centralized, cascade global controller with minor loop predictive adaptive cascade feedback loops for local control of the individual active flow control device or activatable flow effectors that is augmented with the health monitoring system shown in FIG. 14.

FIG. 26 is a flow diagram for a hierarchical control system with a centralized, cascade global controller with minor loop predictive adaptive cascade feedback loops for local control of the individual flow effectors 660 that is augmented with the health monitoring system shown in FIG. 14. This controller is identical to that shown in FIG. 24 and operates in precisely the same manner except that the adaption information 662 is made available to a global health monitoring system 664.

Figure 27:
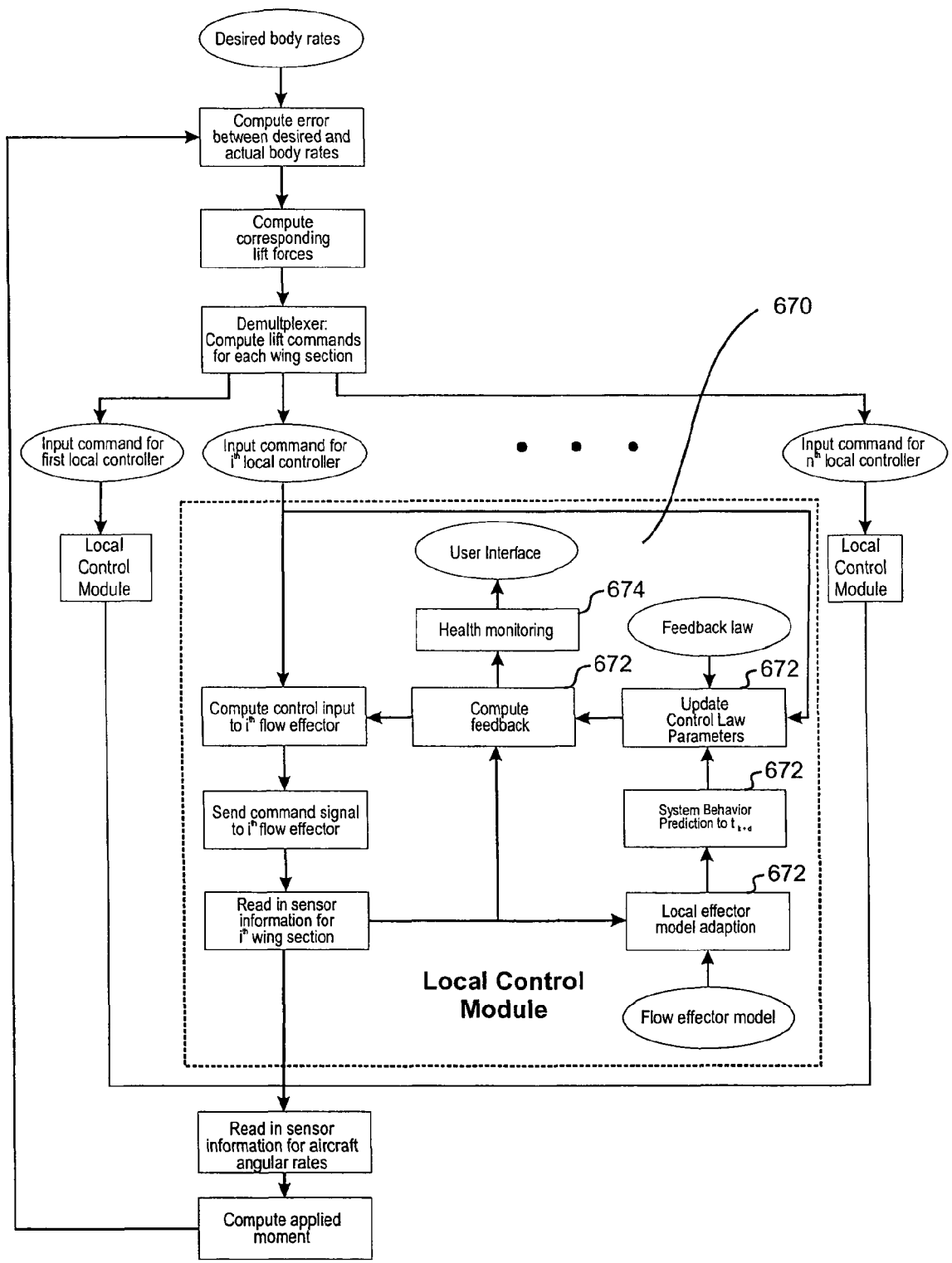
FIG. 27. Flow diagram for an aircraft or missile hierarchical control system with a centralized, cascade global controller with minor loop predictive adaptive output feedback loops for local control of the individual active flow control device or activatable flow effectors that is augmented with the health monitoring system shown in FIG. 14.

FIG. 27 is a flow diagram for a hierarchical control system with a centralized, cascade global controller with minor loop predictive adaptive output feedback loops for local control of the individual flow effectors 670 that is augmented with the health monitoring system shown in FIG. 14. This controller is identical to that shown in FIG. 25 and operates in precisely the same manner except that the adaption information 672 is made available to a global health monitoring system 674.

Figure 28:
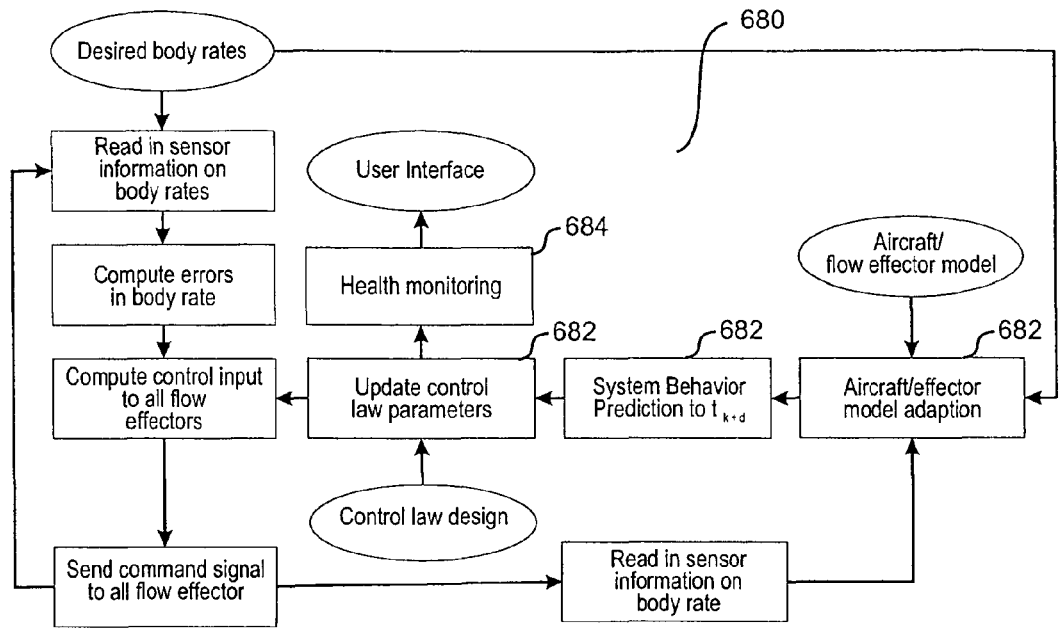
FIG. 28. Flow diagram for a predictive, adaptive, cascade controller for global control of an aircraft or missile that is augmented with the health monitoring system shown in FIG. 14.

FIG. 28 is a flow diagram for a predictive adaptive, cascade controller for global control of an aircraft or missile 680 that is augmented with the health monitoring system shown in FIG. 14. This controller is identical to that shown in FIG. 20 and operates in precisely the same manner except that the adaption information 682 is made available to a global health monitoring system 684.

Figure 29:
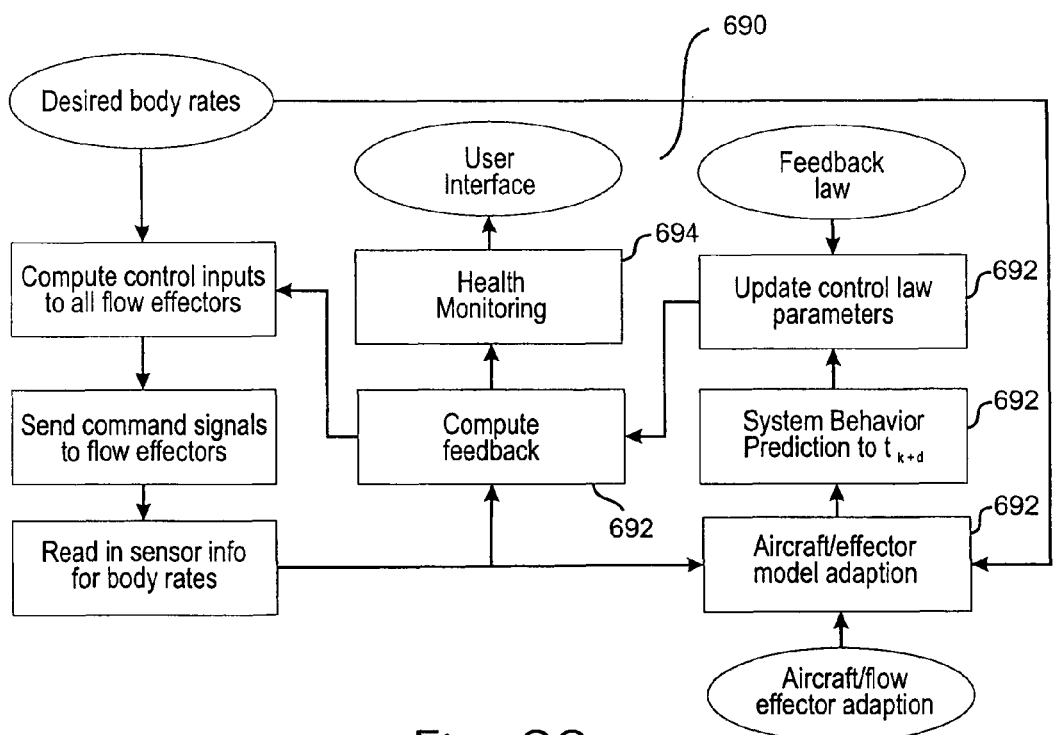
FIG. 29. Flow diagram for a predictive, adaptive, output feedback controller for global control of an aircraft or missile that is augmented with the health monitoring system shown in FIG. 14.

FIG. 29 is a flow diagram for predictive adaptive, output feedback controller for global control of an aircraft or missile 690 that is augmented with the health monitoring system shown in FIG. 14. This controller is identical to that shown in FIG. 21 and operates in precisely the same manner except that the adaption information 692 is made available to a global health monitoring system 694.

Figure 30:
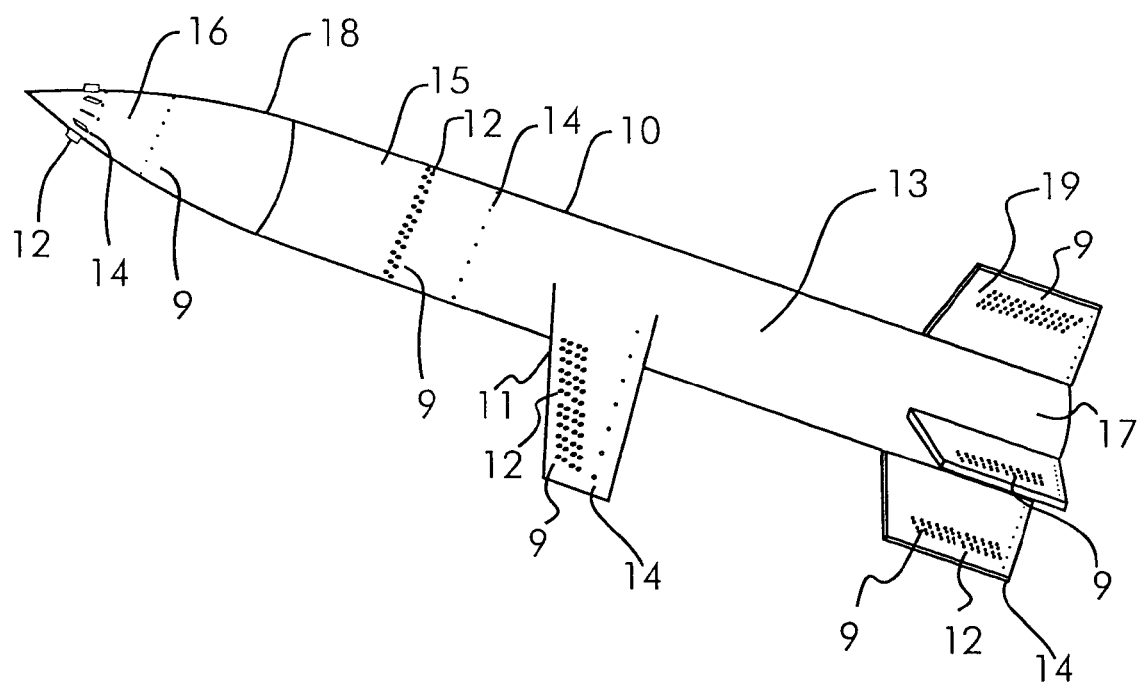
FIG. 30. Schematic view of one embodiment of a missile having multiple flow control zones, a number of the airflow control zones being on aerodynamically-coupled surfaces.

FIG. 30 is a schematic view of one embodiment of a missile having multiple flow control zones, a number of the zones being on aerodynamically-coupled surfaces. In this specific embodiment, the missile 10 is shown having a forebody 18; an afterbody 13; a wing 11; and a fuselage 15 (which is the body of the aircraft or missile that holds everything together), the fuselage containing or being coupled with the parts of the forebody 18 and the afterbody 13. The afterbody 13 comprises the part of the fuselage 15 and the tail section 17. The tail section comprising tail fins 19. In various other embodiments, the tail section 17 may include a rudder (not shown) and a boattail (not shown). The forebody 18 comprising a nose section 16. In this particular embodiment of the missile 10, there are a number of airflow control zones 9. There are two airflow control zones 9 on the forebody 18, one aerodynamic surface, (one in the nose section 16 and one immediately in front of the wing 11); one airflow control zone 9 on the wing 11; and one airflow control zone 9 on each of the three tail fins 19. The wing 11 and the fuselage 15 an example of aerodynamically-coupled surfaces, each having at least one air flow control zone 9 in this embodiment. Each of the airflow control zones 9 comprise at least one active flow control device or activatable flow effector 12, and in this particular embodiment each of the airflow control zones 9 comprise at least one sensor 14. For this embodiment, each of the airflow control zones contain a number of active flow control device or activatable flow effectors 12 and sensors 14. The sensor having a signal and being positioned to detect forces or flow separation from that portion of the aerodynamic surface in the airflow control zone 9. The active flow control device or activatable flow effectors 12 are controlled by one or more logic devices (not shown). The logic devices have a control system comprising a separate local, closed loop control system for each flow control zone 9, and a global control system to coordinate the local control systems.

Figure 31:
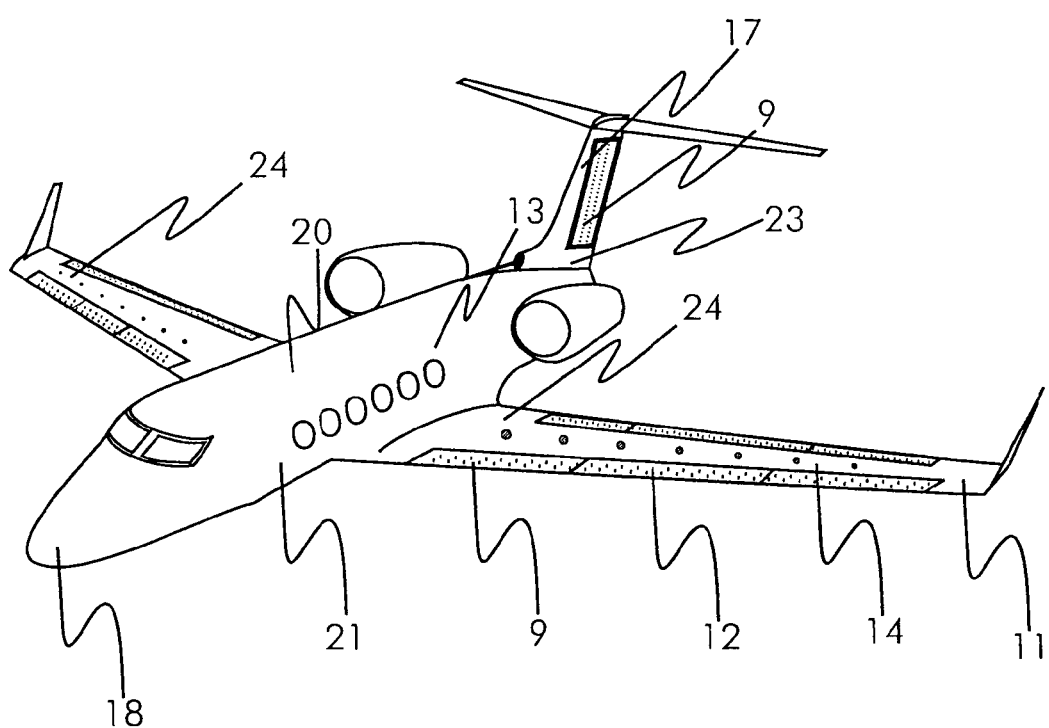
FIG. 31. Schematic view of one embodiment of an aircraft having multiple flow control zones, a number of the airflow control zones being on the same aerodynamic surface.

FIG. 31 is a schematic view of one embodiment of an aircraft having multiple flow control zones, a number of the airflow control zones being on the same aerodynamic surface. The airplane can be any type of aircraft, including commercial, military and space vehicles. The aircraft 20 includes a tail 23, wings 24, forebody (nose) 18, afterbody 13, and a fuselage 21 (which is the body of the aircraft that holds everything together), the fuselage containing or being coupled with the parts of the forebody 18 and afterbody 13. The afterbody comprises part of the fuselage 21 behind the wings 24 and the tail 23. The forebody 18 comprises that part of the fuselage 21 ahead of the wings 24 and any other parts of the aircraft 20 in front of the wings 24. In this specific embodiment, there are six airflow control zones 9 on each of the wings 24. Each of the wings is a single aerodynamic surface. Each of the airflow control zones 9 in this embodiment each comprise at least one active flow control device or activatable flow effector 12, and in this specific embodiment 15 or more per each zone. In this embodiment, the sensors 14 are located across the center of the top surface of the wing 24. The sensors 14 having a signal and being positioned to detect forces or flow separation from that aerodynamic surface, and in particular in the airflow control zone 9 in the sensors 14 vicinity. The airflow control zones and/or flow effectors (including both active flow control device or activatable flow effectors and traditional airflow control surfaces) are controlled by one or more logic devices (not shown). The logic devices have a control system comprising a separate local, closed loop control system for each flow control zone 9, and a global control system to coordinate the local control systems.

Figure 32:
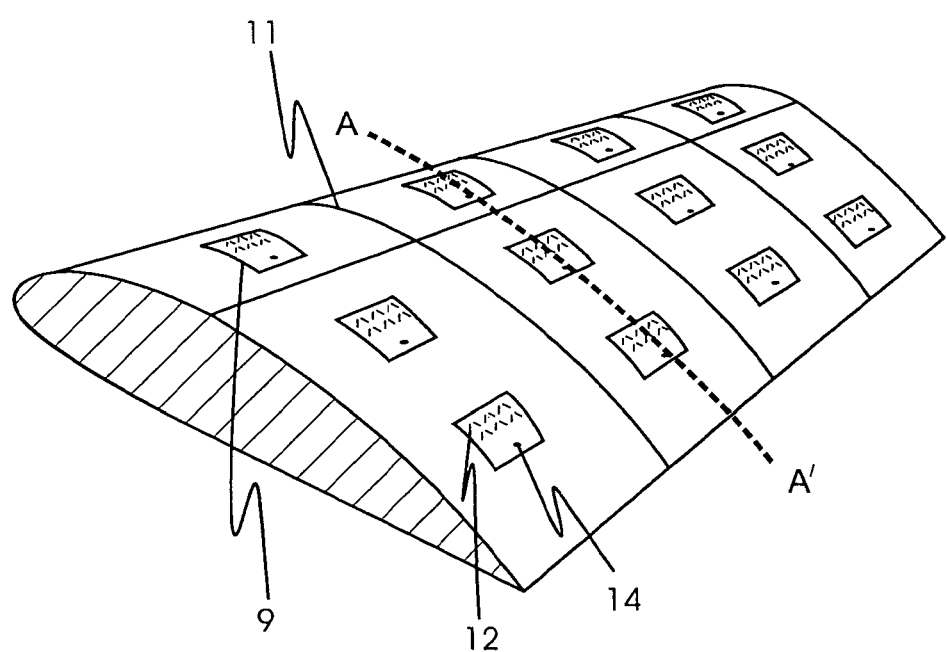
FIG. 32. Perspective view of a wing similar to the wing 24 of the aircraft 20 shown in FIG. 31.

FIG. 32 is a perspective view of a wing similar to the wing 24 of the aircraft 20 shown in FIG. 31. This wing section having active flow control device or activatable flow effectors 12 and a sensor 14 mounted within a module 32 therein. The aircraft wing 24 can be designed with active flow control device or activatable flow effectors 12 and sensors 14 in a module 32 placed in the airflow control zones 9 to provide for better stability or maneuverability control with the present flow control system. This flow control system is designed to provide for a variety of moments about the aircraft, which allow for both flow separation and flow attachment and result in improved stability and maneuverability. These moments can be used to change the drag, the yaw, the lift, the roll, the pitch and the thrust of the missile or aircraft.

Figure 33:
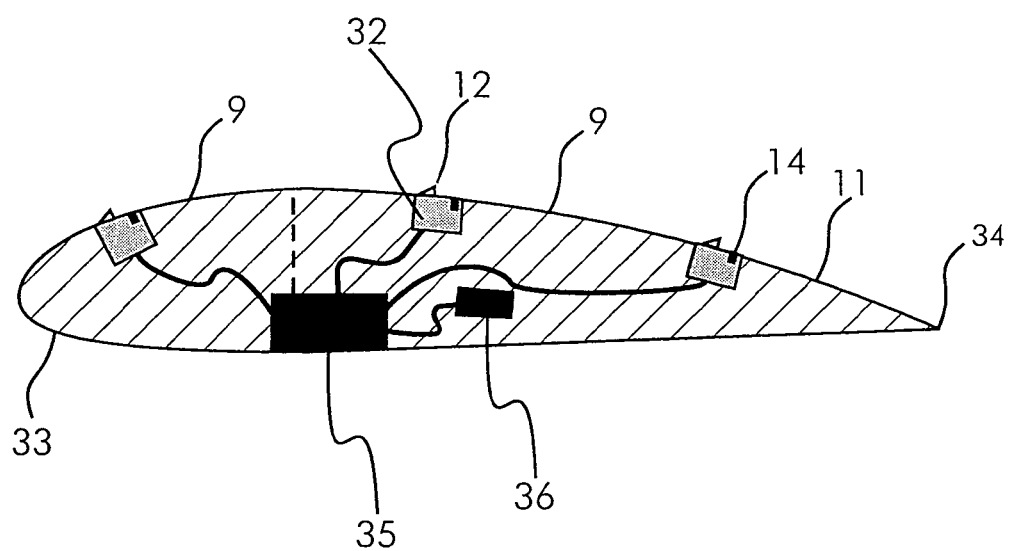
FIG. 33. Sectional view of section A-A' of the aircraft wing as shown in FIG. 32.

FIG. 33 is a sectional view of section A-A' of the aircraft wing as shown in FIG. 32. In this view, the cross-section of three modules are shown in two flow control zones 9, and the leading 33 and trailing edge 34 of the wing 24. The cross-section of the modules 32 shows one of the active flow control device or activatable flow effectors 12, in this case a deployable flow effector 12, and the sensor 14 for the module 32. Each of the modules are hardwired (although they could communicate through wireless components or other means) to one of two logic devices 35. The first logic device 35 houses the local controller. The second logic device 36 houses the global controller.

Figure 34:
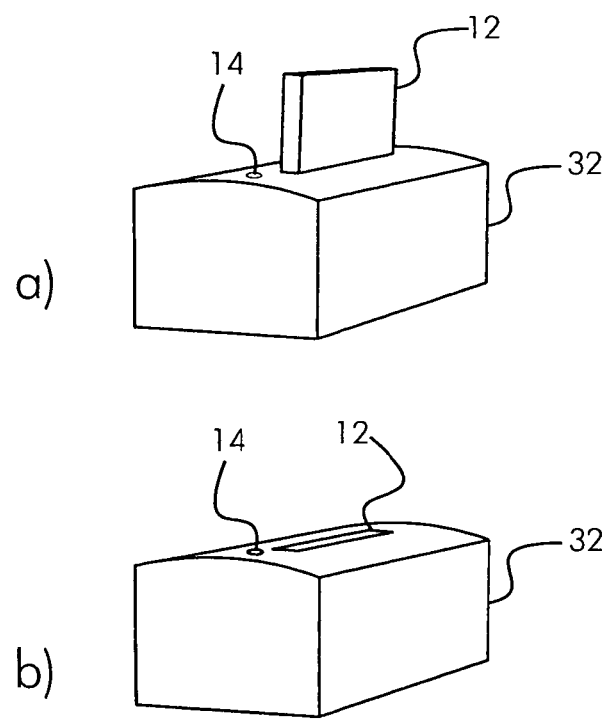
FIG. 34. Perspective view of one embodiment of a module containing a co-located sensor, and a) an deployable flow effector (deployed) and b) a deployable flow effector (retracted).

FIG. 34 is a perspective view of one embodiment of a module containing a co-located sensor, and a) an active flow control device or activatable flow effector (deployed) and b) an active flow control device or activatable flow effector (retracted). In this particular embodiment, the module 32 contains an active flow control device or activatable flow effector 12 and a pressure sensor 14. The active flow control device or activatable flow effector 12 being capable of being deployed into and retracted from, respectively, the fluid boundary layer flowing over the flow surface of the missile or aircraft forebody wherein the module 32 is employed. The deploying and retracting can be accomplished using any device such as pneumatic pressure, hydraulic pressure, vacuum, a mechanical device such as a solenoid valve, a microelectromechanical device, any combination thereof or the like. The module 32 may or may not include a controller (not shown) internal to the module. The pressure sensor 14 is connected to the controller (not shown). If the controller (not shown) is not internal to the module 32 then the module 32 preferably further comprises a link between pressure sensor 14 and the controller, and another link between the controller (not shown) and deploying means (not shown). The controller in this embodiment (not shown) is programmed to operate the deploying and retracting means in response to specific pressure conditions sensed at the flow surface 16. The controller (not shown) can be any device such as a computer, suitable for gathering information from the pressure sensors 14, and directing the activation of the active flow control device or activatable flow effectors 12. Where a number of active flow control device or activatable flow effectors 12 and/or pressure sensors 14 (or modules 32) are employed, the controller (or controllers) (not shown) can be programmed and connected to integrate each of the active flow control device or activatable flow effectors 12, pressure sensors 14 and modules 32 so that the output from all of the regions will be coordinated to enhance and possibly optimize the stabilization and maneuverability of a missile or an aircraft forebody. Specific patterns of deployment and/or retraction of the flow effectors 12 can be determined to handle a variety of routine events and also incorporated into the control scheme.

Figure 35:
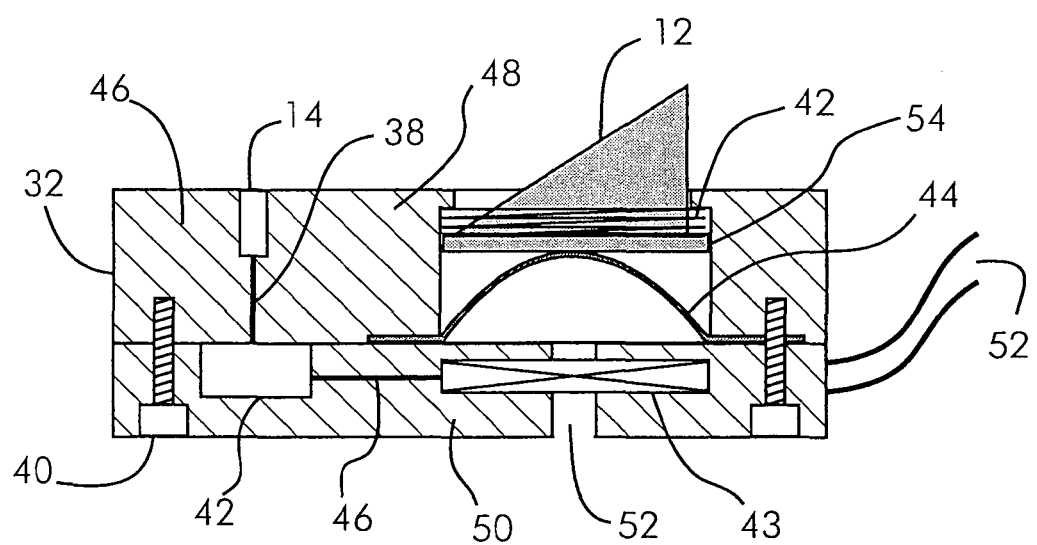
FIG. 35. Sectional view of one embodiment of a deployable flow effector.

FIG. 35 is a sectional, detailed view of a module 32 (as shown in FIG. 34) with an active flow control device or activatable flow effector (specifically a deployable flow effector) 12. In this specific embodiment, the flow effector 12 is movably attached to the upper portion 48 of the housing 46 of the module 32 and is attached to the lower portion 50 of the housing 46 of the module 32 by at least two fasteners 40. The upper portion 48 of the housing 46 mates with the lower portion 50 with a sealing ring (not shown) and a sealable, flexible element 44 there between. The flow effector 12 is deployed by pressure being applied to the flexible element 44. The flow effector 12 has a biasing means (a spring) 42 which attaches at one end to the upper portion 48 of the housing 46 and at the other end to the base 54 of flow effector 12. Directly beneath the flow effector 12 is a valve 43, which opens and closes to allow for the application of fluid or gas pressure from a pressure source not shown to be applied to the flexible element 44 through a pneumatic pathway 52. A pressure sensor 14 senses fluid flow at or near the surface over which the fluid is flowing. Preferably the pressure sensor at the surface of the airfoil, and most preferably it is flush with such surface. The pressure sensor 14 can be any pressure sensor but advantageously is a microelectromechanical (MEMS) based or piezoelectric based sensor. MEMS devices are small mechanical/electrical systems that perform small-scale tasks that provide large-scale effects. MEMS devices are generally manufactured using batch microfabrication technology, the same manufacturing technology used to make integrated circuits (IC's). Consequently, many of the same benefits of IC manufacturing are applicable to MEMS manufacturing including high reliability, high yield, and low cost. Furthermore, since ICs and MEMS are both silicon-based technologies and are fabricated using similar techniques, it is relatively easy to merge microelectronics and micromechanical elements onto the same substrates. Electrostatic actuated MEMS devices have two dominating advantages as compared to other actuation mechanisms, which are high band width and low power consumption. The sensor transmits a signal, in this case a voltage but it is understood to one skilled in the art that the signal can be other than voltage, including, but not limited to, current, pressure, hydraulic or optical. The signal corresponds to the pressure it senses.

The pressure sensor 14 (or other sensors) are connected to a controller 42 internal to the module 32 (or optionally external to the module). The controller is a local controller 42 as described earlier. The controller of the present invention is preferably a closed loop control system. The controller can be used to create forces or reattach flow to the aerodynamic surface of the missile or aircraft through activation of the flow control devices (or effectors) 12. The pressure sensor transmits a signal to the controller 42 through the electrical connection 38 (in practical application, multiple pressure sensors 14 send multiple signals to the controller 42). The controller 42 processes the signals to determine, through mathematical modeling, the dynamics of the flow surface. Such dynamics include boundary layer separation and stall. It is the predictive ability of the controller 42 in combination with the global controller (not shown), which provides for this function and expands this system from being merely responsive. This is especially advantageous for dynamic systems, which are non-linear and time varying and operating in challenging environments. The controller 42 produces an output signal to a monitor, recorder, alarm and/or any peripheral device for alarming, monitoring, or in some manner, affecting or precluding the dynamics upon its incipience. Advantageously, one of the components of the controller 42 is the ORICA™ controller, an extended horizon, adaptive, predictive controller, produced by Orbital Research, Inc. and patented under U.S. Pat. No. 5,424,942, which is incorporated herein by reference. Under certain conditions, the controller 42 (or optionally an external controller) which is connected via electrical connection 46 to the valve 43 causes the valve 43 to open thereby resulting in the deployment of the flow effector(s) 12.

The multilevel, closed loop control system of the present invention not only receives input in part from the sensors, but also can be set up to receive input from a number of other sources. These sources can include but are not limited to the autopilot, crash avoidance, or steering systems on an aircraft; or similar systems or non-integral, non-internal command control systems used to re-program a missile in flight. The missile or aircraft can be maneuvered or stabilized using the flow control system based in part on the sensors input and in part (if necessary) on new input from for example the autopilot into the closed loop control system to activate or deactivate the flow effectors as required.

Preferably, the pressure source (or other deployment and/or retraction means) is internal to the module 12. The sealable, flexible element 44 referred to above can be made of an individual polymer or a combination of polymers. The pressure source can be air bled from an aircraft turbine engine, a pressurized gas cartridge, or pressurized fluid. The biasing means is employed to urge the sealable, flexible element 44 towards its quiescent state after pressure is removed or reduced. The biasing means can be any device or spring like means, such as vacuum or pressure, mechanical or electromechanical device.

Figure 36:
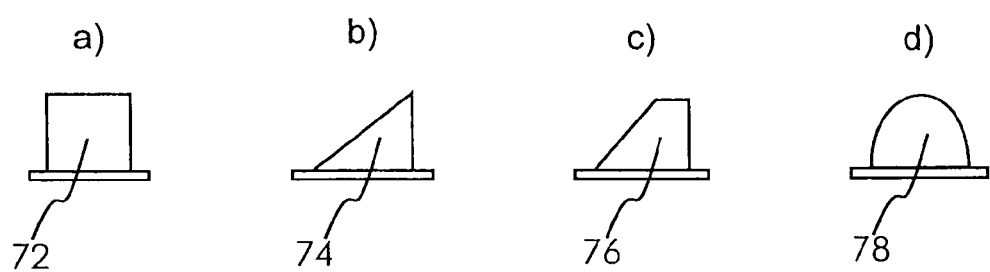
FIG. 36. Sectional view of deployable flow effector shapes.

The deployable portion of the active flow control device or activatable flow effectors shown in the previous Figures are small mechanical tabs preferably made from epoxy glass-fabric, and deactivate to assume a position underneath the skin surface of the missile or aircraft in their retracted state. Several examples of various embodiments of the flow effectors are shown in FIG. 36 a, b, c and d. These cross-sectional views demonstrate that rectangular 72, triangular 74, irregular 76, semi-circular 78, and square not shown can be used. The present invention is, however, not limited to these shapes and it is envisioned that any shape of flow effector known presently or conceived of in the future by those skilled in the art may be used. Other types of deployable flow effectors which can be used these include but are not limited to fences, bumps, dimples, and tubes. Upon controlled activation, the flow effectors (deployable or other) manipulate the forebody of the missile or aircraft's vortical flow field to generate the desired forces or flow separation. Single flow effectors or combinations of flow effectors can be activated either statically or cycled at a varying frequency (oscillated) to obtain a desired side force or yawing moment. Varying frequency or oscillation of the flow effectors includes but is not limited to pulse width modulation or other techniques known to those skilled in the art.

Figure 37:
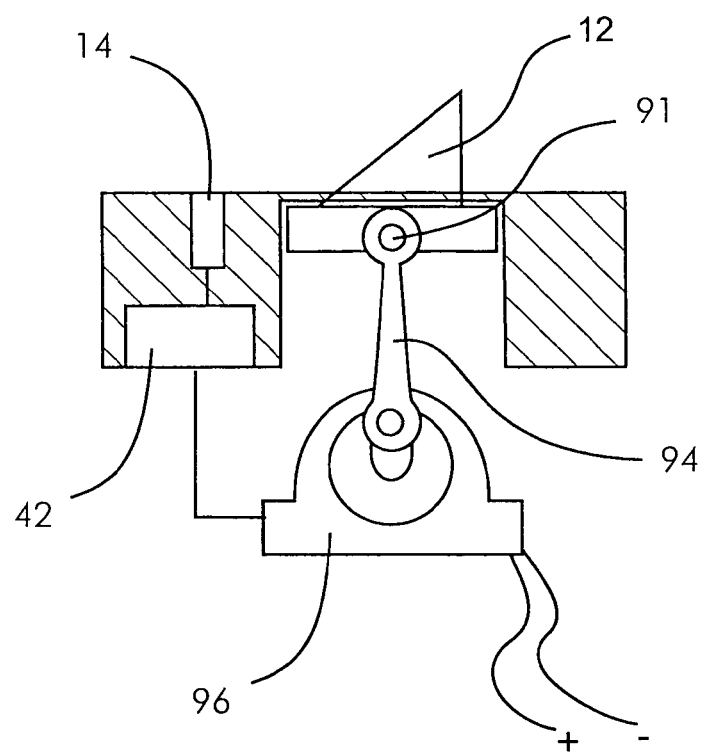
FIG. 37. Sectional view of another embodiment of a deployable flow effector.

FIG. 37 is a sectional view of another embodiment of a deployable flow effector. The flow effectors 12 are further movably attached to a camshaft 94. The camshaft 94 moves in response to an electric motor 96 to deploy and retract the flow effector 12. The motor is connected to a controller 42. The controller 42 activates and deactivates the deployable flow effector in response to at least in part the signal from the sensor 14.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A missile or a munition comprising:
   a. an aerodynamic surface or surfaces;
   b. at least two air flow control zones on one or more aerodynamic surfaces of the missile or munition, at least one of the at least two air flow control zones comprising at least one activatable flow effector capable of being activated and deactivated, wherein the at least one activatable flow effector is deactivated when the activatable flow effector is flush or nearly flush to the aerodynamic surface or surfaces of the missile or munition on or in which the activatable flow effector is located;
   c. one or more digital logic devices, the digital logic devices having a separate local, closed loop control system for each flow control zone for activating and deactivating the at least one activatable flow effector to, in part, maneuver the missile or munition, and a global control system to coordinate the local control systems; and
   d. a health monitoring system comprising at least one pattern recognition algorithm and at least one decision system and an output,
      wherein the health monitoring system output is passed to a user interface and/or to an adaptation algorithm.

2. The missile or munition in claim 1, wherein the at least one activatable flow effector is operated in a binary manner, and is capable of operating at a frequency of at least 1 Hz.

3. The missile or munition in claim 1, further comprising at least one sensor having a signal, wherein the separate local, closed loop control system activates and deactivates the at least one activatable flow effector based on at least in part the signal of the at least one sensor.

4. The missile or munition in claim 3, wherein the separate local closed loop control system monitors the at least one activatable flow effector and/or the at least one sensor and adjusts an output to take into account a lower performance or a failure of either the at least one activatable flow effector; or the at least one sensor.

5. The missile or munition in claim 3, further comprising a means for determining a relative spatial orientation of the flow effectors and/or sensors on the missile or munition.

6. The missile or munition in claim 1 wherein the global control system calculates, estimates or predicts a desired moment for the aerodynamic surface or surfaces and outputs a signal corresponding to a desired local moment to the local closed loop control system for at least one of the air flow control zones comprising the at least one activatable flow effector.

7. The missile or munition in claim 1 wherein the activatable flow effector is a deployable flow effector.

8. A missile or a munition comprising:
   a. an aerodynamic surface or surfaces;
   b. at least two air flow control zones on the aerodynamic surface or surfaces of the missile or munition, at least one of the at least two air flow control zones comprising at least one activatable flow effector capable of being activated and deactivated, wherein the at least one activatable flow effector is deactivated when the activatable flow effector is flush or nearly flush to the aerodynamic surface or surfaces of the missile or munition on or in which the activatable flow effector is located; and
   c. one or more digital logic devices, the digital logic devices having a separate local, closed loop control system for each flow control zone for activating and deactivating the at least one activatable flow effector to, in part, maneuver the missile or munition, and a global control system to coordinate the local control systems.

9. The missile, or munition in claim 8, wherein the at least one activatable flow effector is operated in a binary manner, and is capable of operating at a frequency of at least 1 Hz.

10. The missile or munition in claim 8, further comprising at least one sensor having a signal, wherein the separate local, closed loop control system activates and deactivates the at least one activatable flow effector based on at least in part the signal of the at least one sensor.

11. The missile or munition in claim 10, wherein the separate, local closed loop control system monitors the at least one activatable flow effector, and/or the at least one sensor and adjusts an output to take into account a lower performance or a failure of either the at least one flow control device or flow effector or the at least one sensor.

12. The missile, or munition in claim 10, further comprising a means for determining a relative spatial orientation of the flow effectors and/or sensors on the missile or munition.

13. The missile or munition in claim 8, wherein the global control system calculates, estimates or predicts a desired moment for the aerodynamic surface or surfaces and outputs a signal corresponding to a desired local moment to the separate, local closed loop control system for the at least one air flow control zones comprising the at least one activatable flow effector.

14. The missile, or munition in claim 8, comprising at least six flow control zones wherein at least two flow control zones comprise at least one activatable flow effectors activated or deactivated by the separate local, closed loop control system.

15. A missile or a munition comprising:
   a. an aerodynamic surface or surfaces;
   b. at least two air flow control zones on one or more aerodynamic surface or surfaces of the missile or munition; at least one of the air flow control zones comprising at least one activatable flow effector that is activated and deactivated, wherein the at least one activatable flow effector is deactivated when the activatable flow effector is flush or nearly flush to the aerodynamic surface or surfaces of the missile or munition on or in which the activatable flow effector is located, selected from the group consisting of active vortex generators, which are deployable or create pressure active regions by suction or air pressure; pulsed vortex generators, plasma actuators; wall turbulators; active porosity; and thermal actuators;

c. one or more digital logic devices, the digital logic devices having a separate local, closed loop control system for each flow control zone, and a global control system to coordinate the separate, local control systems.

16. The missile or munition in claim 15 wherein the separate local, closed loop control system activates and deactivates the at least one deployable flow effector based on at least in part a signal of at least one sensor.

17. The missile or munition in claim 15 wherein the at least one activatable flow effector is operated in a binary manner, and is capable of operating at a frequency of at least 1 Hz.

18. The missile or munition in claim 16, wherein the control system monitors the at least one deployable flow effector and/or at least one sensor and adjusts an output to take into account a lower performance or a failure of either the at least one deployable flow effector or the at least one sensor.

19. The missile or munition in claim 16, further comprising a means for determining a relative spatial orientation of the flow effectors and/or sensors on the missile or munition.

20. The missile or munition in claim 16, wherein the global control system calculates, estimates or predicts a desired moment for the aerodynamic surface or surfaces and outputs a signal corresponding to a desired local moment to the separate, local closed loop control system for the at least one air flow control zones comprising the at least one activatable flow effector.

* * * * *